US007613823B1

(12) United States Patent
Lin et al.

(10) Patent No.: US 7,613,823 B1
(45) Date of Patent: Nov. 3, 2009

(54) ENHANCED CHANNEL ACCESS MECHANISMS FOR AN HPNA NETWORK

(75) Inventors: Wei Lin, Warren, NJ (US); Matthew J. Sherman, Succasunna, NJ (US)

(73) Assignee: AT&T Intellectual Property II, L.P., Bedminster, NJ (US)

( * ) Notice: Subject to any disclaimer, the term of this patent is extended or adjusted under 35 U.S.C. 154(b) by 1251 days.

(21) Appl. No.: 10/042,142

(22) Filed: Jan. 11, 2002

Related U.S. Application Data

(60) Provisional application No. 60/269,354, filed on Feb. 20, 2001, provisional application No. 60/269,861, filed on Feb. 21, 2001.

(51) Int. Cl.
*G06F 15/16* (2006.01)
(52) U.S. Cl. .................. 709/236; 370/376; 370/458; 370/459; 709/230
(58) Field of Classification Search ............... 370/376, 370/458, 459; 709/230, 236
See application file for complete search history.

(56) References Cited

U.S. PATENT DOCUMENTS

| | | | | |
|---|---|---|---|---|
| 4,593,282 | A | * | 6/1986 | Acampora et al. .......... 370/447 |
| 5,084,877 | A | | 1/1992 | Netravali |
| 5,572,678 | A | * | 11/1996 | Homma et al. ............. 709/227 |
| 5,623,495 | A | | 4/1997 | Eng |
| 5,638,371 | A | | 6/1997 | Raychaudhuri |
| 5,717,688 | A | | 2/1998 | Belanger |
| 5,734,867 | A | * | 3/1998 | Clanton et al. ............. 370/461 |
| 5,949,768 | A | | 9/1999 | Citta |
| 5,982,748 | A | | 11/1999 | Yin |
| 6,009,468 | A | * | 12/1999 | Lau et al. .................. 709/225 |
| 6,031,833 | A | | 2/2000 | Fickes |
| 6,034,967 | A | | 3/2000 | Citta |
| 6,115,390 | A | | 9/2000 | Chuah |

(Continued)

FOREIGN PATENT DOCUMENTS

JP     02072736 A     3/1990

(Continued)

OTHER PUBLICATIONS

Cali et al. "IEEE 802.11 Wireless LAN: Capacity Analysis and Protocol Enhancement," IEEE, 0-7803-4386-7/98, pp. 1-8, 1998.

(Continued)

*Primary Examiner*—Jeffrey Pwu
*Assistant Examiner*—Alicia Baturay
(74) *Attorney, Agent, or Firm*—Michael Haynes PLC; Michael N. Haynes

(57) ABSTRACT

A system and a method is disclosed that provides that access to a communications medium that is suitable for allowing HPNA v2-formatted frames in a centralized manner. A list of sessions in enhanced STAs using the communications medium is maintained at a Media Control Station (MC STA). Each enhanced STA gains access to the communications medium in a centralized manner. A message is transmitted from the MC STA to a selected non-MC STA. The transmitted message is transmitted with a highest physical layer priority level available in a first HPNA v2-formatted frame. After the message is received at a non-MC STA, the non-MC STA transmits a reply message to the MC STA in response to the received message that is transmitted at the highest physical layer priority level available in a second HPNA v2-formatted frame.

74 Claims, 9 Drawing Sheets

U.S. PATENT DOCUMENTS

| | | | |
|---|---|---|---|
| 6,118,793 A | 9/2000 | Chen | |
| 6,119,214 A | 9/2000 | Dirks | |
| 6,137,793 A * | 10/2000 | Gorman et al. | 370/360 |
| 6,252,881 B1 | 6/2001 | Samoylenko | |
| 6,262,976 B1 | 7/2001 | McNamara | |
| 6,317,438 B1 | 11/2001 | Trebes, Jr. | |
| 6,366,577 B1 | 4/2002 | Donovan | |
| 6,377,548 B1 | 4/2002 | Chuah | |
| 6,377,998 B2 | 4/2002 | Noll | |
| 6,411,611 B1 | 6/2002 | van der Tuijn | |
| 6,452,915 B1 | 9/2002 | Jorgensen | |
| 6,532,279 B1 * | 3/2003 | Goodman | 379/90.01 |
| 6,538,989 B1 | 3/2003 | Carter | |
| 6,563,793 B1 | 5/2003 | Golden | |
| 6,563,816 B1 * | 5/2003 | Nodoushani et al. | 370/352 |
| 6,567,408 B1 | 5/2003 | Li | |
| 6,567,416 B1 | 5/2003 | Chuah | |
| 6,587,453 B1 | 7/2003 | Romans | |
| 6,597,682 B1 | 7/2003 | Kari | |
| 6,600,744 B1 | 7/2003 | Carr | |
| 6,625,156 B2 | 9/2003 | Shaio | |
| 6,628,629 B1 | 9/2003 | Jorgensen | |
| 6,636,518 B1 | 10/2003 | Liencres | |
| 6,640,248 B1 | 10/2003 | Jorgensen | |
| 6,661,849 B1 * | 12/2003 | Guo et al. | 375/261 |
| 6,671,276 B1 | 12/2003 | Bakre | |
| 6,674,765 B1 * | 1/2004 | Chuah et al. | 370/458 |
| 6,701,406 B1 * | 3/2004 | Chang et al. | 710/310 |
| 6,704,321 B1 | 3/2004 | Kamiya | |
| 6,704,932 B1 | 3/2004 | Matsunaga | |
| 6,711,138 B1 | 3/2004 | Pai | |
| 6,728,365 B1 | 4/2004 | Li | |
| 6,731,627 B1 * | 5/2004 | Gupta et al. | 370/352 |
| 6,732,315 B2 * | 5/2004 | Yagil et al. | 714/755 |
| 6,738,361 B1 | 5/2004 | Immonen | |
| 6,741,576 B1 | 5/2004 | Alimi | |
| 6,747,959 B1 * | 6/2004 | Ho | 370/282 |
| 6,747,968 B1 | 6/2004 | Seppala | |
| 6,747,996 B2 * | 6/2004 | Holloway et al. | 370/503 |
| 6,754,176 B1 | 6/2004 | Gubbi | |
| 6,765,872 B1 | 7/2004 | Tazaki | |
| 6,765,927 B1 | 7/2004 | Martin | |
| 6,778,549 B1 * | 8/2004 | Keller | 370/430 |
| 6,778,646 B1 * | 8/2004 | Sun | 379/93.05 |
| 6,781,989 B1 * | 8/2004 | Acharya | 370/392 |
| 6,785,252 B1 | 8/2004 | Zimmerman | |
| 6,788,950 B1 | 9/2004 | Raissinia | |
| 6,801,541 B1 * | 10/2004 | Maleck | 370/466 |
| 6,804,222 B1 * | 10/2004 | Lin et al. | 370/338 |
| 6,810,520 B2 | 10/2004 | Lu | |
| 6,839,345 B2 | 1/2005 | Lu | |
| 6,850,981 B1 * | 2/2005 | Ho et al. | 709/227 |
| 6,862,270 B1 * | 3/2005 | Ho | 370/328 |
| 6,862,280 B1 * | 3/2005 | Bertagna | 370/392 |
| 6,862,630 B1 * | 3/2005 | Garg et al. | 709/250 |
| 6,868,072 B1 | 3/2005 | Lin | |
| 6,877,043 B2 * | 4/2005 | Mallory et al. | 709/251 |
| 6,882,634 B2 * | 4/2005 | Bagchi et al. | 370/338 |
| 6,888,844 B2 * | 5/2005 | Mallory et al. | 370/466 |
| 6,891,881 B2 * | 5/2005 | Trachewsky et al. | 375/143 |
| 6,894,999 B1 * | 5/2005 | Acharya | 370/352 |
| 6,898,204 B2 * | 5/2005 | Trachewsky et al. | 370/445 |
| 6,907,066 B1 | 6/2005 | Nayler | |
| 6,909,725 B1 * | 6/2005 | Chow | 370/467 |
| 6,922,407 B2 * | 7/2005 | Wu | 370/355 |
| 6,925,089 B2 * | 8/2005 | Chow et al. | 370/419 |
| 6,928,057 B2 * | 8/2005 | Bullman et al. | 370/252 |
| 6,940,918 B1 * | 9/2005 | Nayler et al. | 375/295 |
| 6,944,148 B1 | 9/2005 | Gehring | |
| 6,947,438 B1 * | 9/2005 | Chang et al. | 370/419 |
| 6,947,480 B2 * | 9/2005 | Beale et al. | 375/229 |
| 6,950,397 B1 * | 9/2005 | Ho et al. | 370/235 |
| 6,954,800 B2 * | 10/2005 | Mallory | 709/240 |
| 6,961,344 B1 * | 11/2005 | Gaspar et al. | 370/447 |
| 6,963,545 B1 * | 11/2005 | Ho | 370/282 |
| 6,970,422 B1 * | 11/2005 | Ho et al. | 370/230 |
| 6,973,094 B1 | 12/2005 | Holloway | |
| 6,975,655 B2 * | 12/2005 | Fischer et al. | 370/516 |
| 6,988,236 B2 * | 1/2006 | Ptasinski et al. | 714/758 |
| 6,996,712 B1 | 2/2006 | Perlman | |
| 6,999,442 B1 * | 2/2006 | Ho et al. | 370/338 |
| 7,000,031 B2 * | 2/2006 | Fischer et al. | 709/248 |
| 7,006,517 B1 * | 2/2006 | Ben Michael et al. | 370/445 |
| 7,010,051 B2 | 3/2006 | Murayama | |
| 7,031,274 B2 * | 4/2006 | Sherman | 370/321 |
| 7,031,287 B1 * | 4/2006 | Ho et al. | 370/338 |
| 7,035,270 B2 | 4/2006 | Moore, Jr. | |
| 7,035,285 B2 * | 4/2006 | Holloway et al. | 370/474 |
| 7,039,032 B1 * | 5/2006 | Ho et al. | 370/338 |
| 7,068,649 B2 | 6/2006 | Fisher | |
| 7,142,563 B1 | 11/2006 | Lin | |
| 7,180,855 B1 | 2/2007 | Lin | |
| 7,197,244 B2 | 3/2007 | Thomas | |
| 7,293,103 B1 * | 11/2007 | Lin et al. | 709/236 |
| 7,298,757 B1 * | 11/2007 | Lin et al. | 370/447 |
| 7,310,326 B1 * | 12/2007 | Lin et al. | 370/348 |
| 7,400,643 B2 | 7/2008 | Hansen | |
| 2002/0003835 A1 | 1/2002 | Wu | |
| 2002/0012343 A1 * | 1/2002 | Holloway et al. | 370/389 |
| 2002/0015404 A1 | 2/2002 | Fisher | |
| 2002/0026523 A1 * | 2/2002 | Mallory et al. | 709/236 |
| 2002/0027886 A1 * | 3/2002 | Fischer et al. | 370/255 |
| 2002/0042836 A1 * | 4/2002 | Mallory | 709/232 |
| 2002/0057717 A1 * | 5/2002 | Mallory | 370/503 |
| 2002/0061012 A1 | 5/2002 | Thi | |
| 2002/0078247 A1 | 6/2002 | Lu | |
| 2002/0078249 A1 | 6/2002 | Lu | |
| 2002/0114325 A1 | 8/2002 | Dale | |
| 2002/0131441 A1 | 9/2002 | Trachewsky | |
| 2002/0163932 A1 * | 11/2002 | Fischer et al. | 370/465 |
| 2004/0114619 A1 | 6/2004 | Park | |
| 2007/0064720 A1 * | 3/2007 | Sterenson et al. | 370/445 |

OTHER PUBLICATIONS

Deng et al. "A Priority Scheme for IEEE 802.11 DCF Access Method," IEICI Trans. Comm., vol. E82-B, No. 1, pp. 96-102, Jan. 1999.

Zhijun, Gong, et al. "QoS guaranteed Wireless LAN—Wireless access to ATM", International Conference on Communication Technology, ICCT'98, Oct. 22-24, 1998, Beijing, China, pp. S31-11-1 through S31-11-5.

R. Yavatkar et al., "SBM (Subnet Bandwidth Manager): A Protocol for RSVP-Based Admission Control Over IEEE 802-Style Networks", www.itef.org, May 2000, pp. 1-60, RFC 2814, Internet Engineering Task Force.

R. Braden et al., "Resource Reservation Protocol (RSVP)", www.itef.org, Sep. 1997, pp. 1-112, RFC 2205, ver. 1, Internet Engineering Task Force.

Amodei, Aurelio et al., "Increasing the Throughput of the HomePNA MAC Protocol, IEEE, Proceedings of the 29th Annual IEEE International Conference on Local Computer Networks (LCN '04), 8 Pages", Nov. 1, 2004, 8 page(s), None.

Davies, Nigel and Raverdy, Pierre-Guillaume, "Position Paper: The Role of Platforms and Operating Systems in Supporting Home Networks", Proceedings of the 9th Workshop on ACM SIGOPS European Workshop: Beyond the PC: New Challenges for the OS, Sep. 1, 2000, 6 page(s), ACM Press, None.

Ho, Jin-Meng, "Centralized Contention and Reservation Request for QOS-Driven Wireless LANS", U.S. Appl. No. 09/617,439, filed Jul. 14, 2000, 77 page(s), US.

Ho, Jin-Meng, "Enhanced Channel Access Mechanisms for QOS-Driven Wireless LANS", U.S. Appl. No. 09/616,885, filed Jul. 14, 2000, 76 page(s), US.

Ho, Jin-Meng, "Multipoll for QOS-Driven Wireless LANS", U.S. Appl. No. 09/616,884, Jul. 14, 2000, 72 page(s), US.

Ho, Jin-Meng, "RSVP/SBM Based Up-Stream Session Setup, Modification, and Teardown for QOS-Driven Wireless LANS", U.S. Appl. No. 09/616,878, Jul. 14, 2000, 82 page(s), US.

Ho, Jin-Meng, "Virtual Streams for QOS-Driven Wireless LANS", U.S. Appl. No. 09/617,083, filed Jul. 14, 2000, 69 page(s), US.

Lin, "U.S. Appl. No. 10/042,142", Enhanced Channel Access Mechanisms for an HPNA Network, filed Jan. 11, 2002, 75 page(s), US.

Lin, "U.S. Appl. No. 10/042,143", Enhanced Channel Access Mechanisms for an HPNA Network, filed Jan. 11, 2002, 52 page(s), US.

Lin, "U.S. Appl. No. 10/042,165", Enhanced Channel Access Mechanisms for an HPNA Network, filed Jan. 11, 2002, 51 page(s), US.

Lin, "U.S. Appl. No. 10/042,179", Enhanced Channel Access Mechanisms for an HPNA Network, filed Jan. 11, 2002, 62 page(s), US.

Lin, "U.S. Appl. No. 11/256,598", Enhanced Channel Access Mechanisms for an HPNA Network, filed Oct. 21, 2005, 53 page(s), US.

U.S. Appl. No. 11/598,575, Lin, Nov. 13, 2006.

U.S. Appl. No. 11/824,364, Lin, filed Jan. 11, 2002.

Lin, "U.S. Appl. No. 11/256,598", Enhanced Channel Access Mechanisms for an HPNA Network, Oct. 21, 2005, 53 page(s), US.

Lin, "U.S. Appl. No. 11/398,297", Enhanced Channel Access Mechanisms for an HPNA Network, Apr. 5, 2006, 53 page(s), US.

* cited by examiner

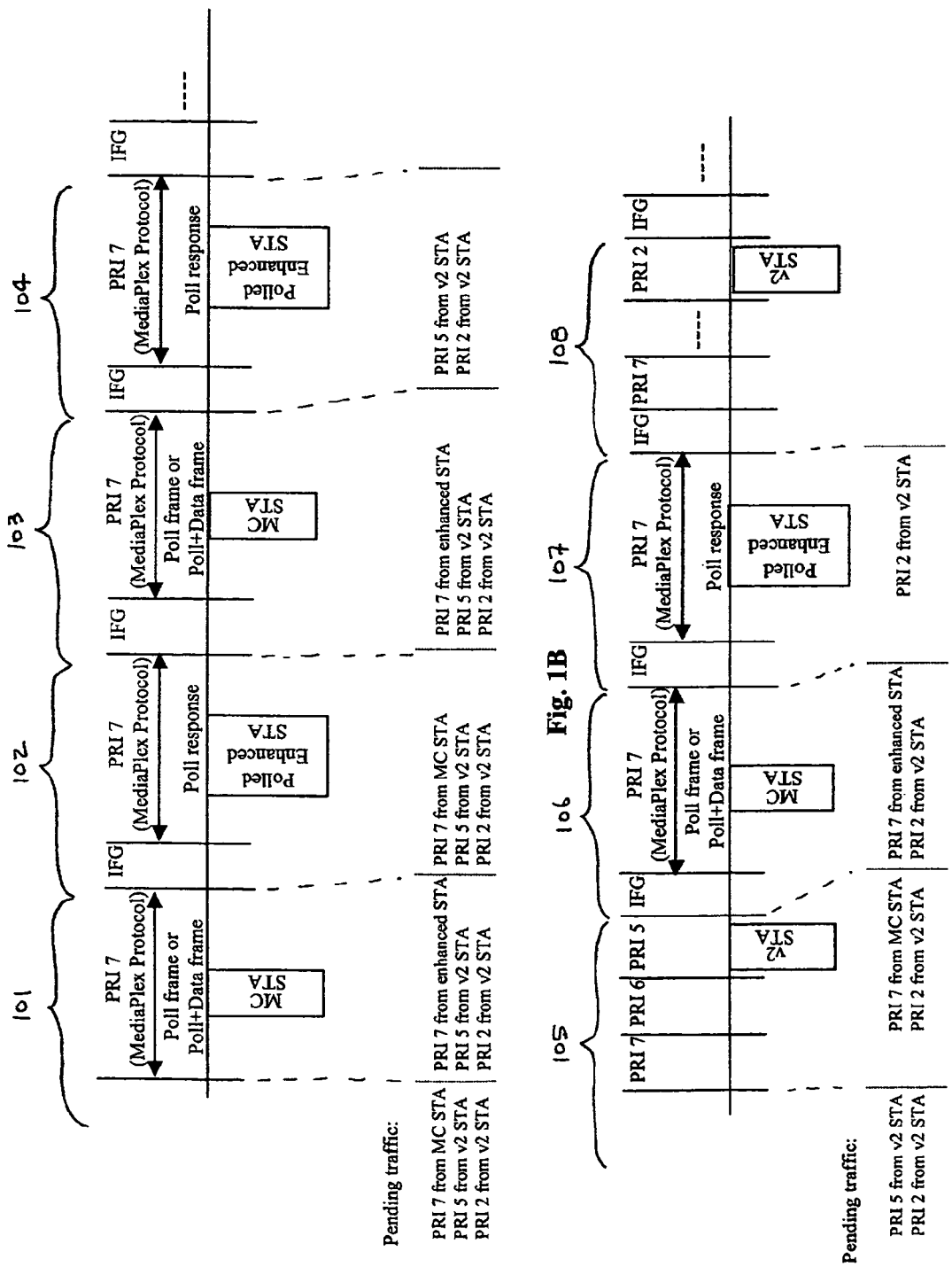

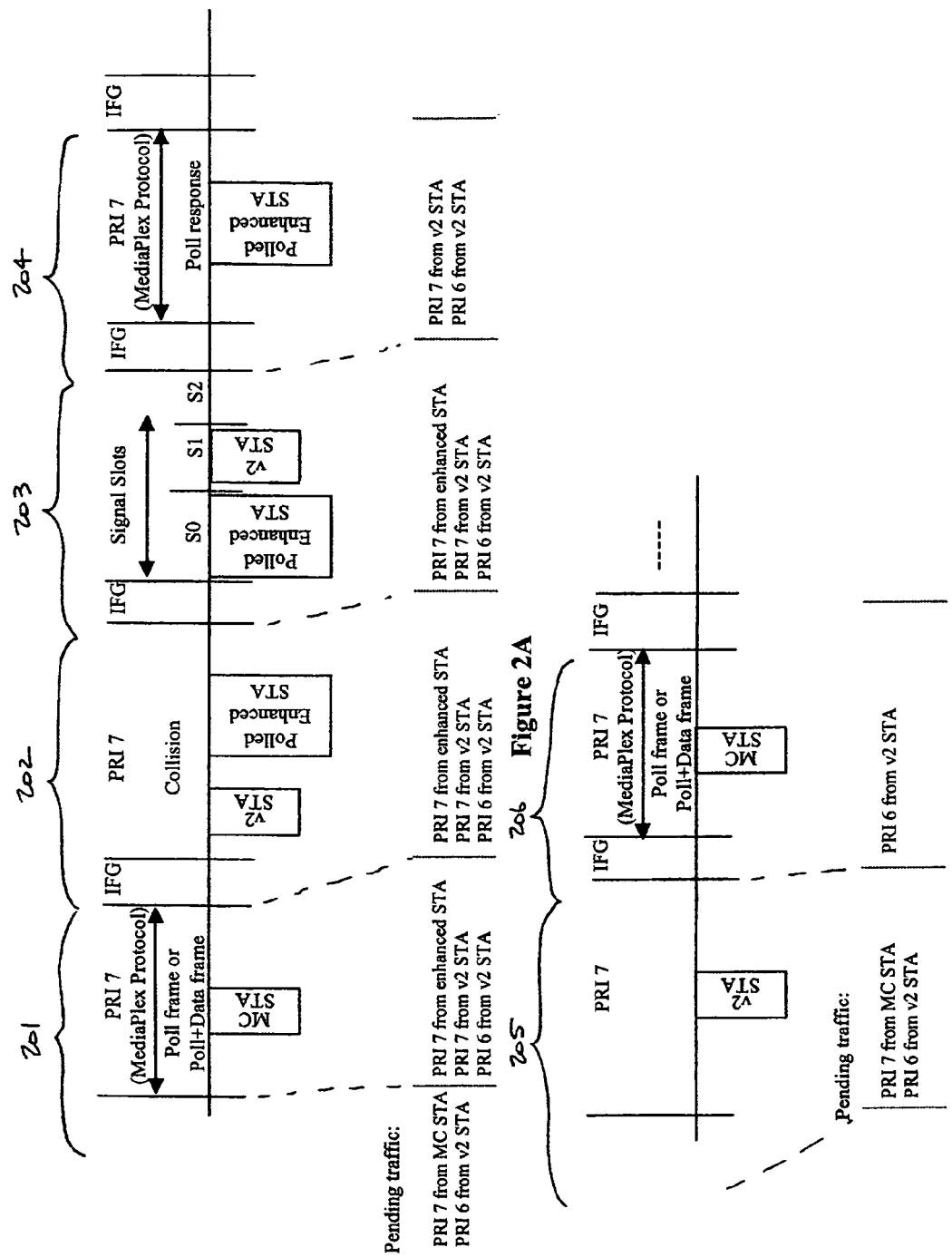

ENHANCED CHANNEL ACCESS MECHANISMS FOR AN HPNA NETWORK

This application claims priority to provisional U.S. Application Ser. No. 60/269,354, entitled "Enhanced Channel Access Mechanisms For A QoS-Driven HPNA Network," invented by Wei Lin and Matthew Sherman, filed Feb. 20, 2001, and provisional U.S. Application Ser. No. 60/269,861, entitled HPNA 3.0 channel access mechanism for compatibility with HPNA 2, invented by Matthew J. Sherman, filed Feb. 21, 2001, both of which are incorporated by reference herein. The present application is also related to U.S. patent application Ser. No. 10/042,165 now U.S. Pat. No. 7,298,757, U.S. patent application Ser. No. 10/042,179 now U.S. Pat. No. 7,293,103, U.S. patent application Ser. No. 10/042,166 now U.S. Pat. No. 7,310,326, and pending U.S. patent application Ser. No. 10/042,143, each entitled "Enhanced Channel Access Mechanism For QoS-Driven HomePNA (HPNA 2.1), each filed on Dec. 19, 2001, and each incorporated by reference herein.

BACKGROUND OF THE INVENTION

1. Field of the Invention

The invention relates to communication networks. More particularly, the present invention relates to a system and method for providing preferential access to a multiple access communications medium.

2. Background of the Related Art

The importance of bringing broadband communications the "last mile" so that the benefits of broadband communications can be provided to a home environment has been recognized. More recently, the "last foot" has been recognized as being an enabler for broadband communications in a home environment. That is, it is not enough to merely bring broadband communications into a home, broadband communications must be brought to each individual communicating device within a home for broadband communications to be useful. Home Networking (HN) accomplishes the "last foot" and, therefore, is gaining increasing importance.

Home Networking (HN) differs from traditional networking, such as the networking utilized in an office and/or business environment, in that it is more cost sensitive than traditional networking. That is, homeowners are usually more sensitive to the costs associated with installing networking technology than are businesses. Additionally, HN must be simpler to install than traditional networking because it is unlikely that a home environment has been configured for accommodating a traditional business networking technology, such as an Ethernet, which requires special wiring. The cost of installing special wiring is likely to be prohibitive for a homeowner, as will be the complexity of a traditional network installation. Further, because a homeowner does not usually have access to a trained staff of technicians for maintaining a networking infrastructure, HN technology must be simpler to use and maintain than a traditional network environment.

Consequently, HN technologies have been developed that do not require installation of special wiring. For example, one HN technology utilizes a wireless communication medium. Another HN technology utilizes power lines for the communication medium. Yet another HN technology utilizes telephone lines (or more properly, an arbitrary set of electrically connected pieces of telephone wire) as the communication medium. Such a telephone-wire-based HN will be referred to herein as an HPN.

In particular, one telephone line-based HN technology, referred to as HomePNA 2.0, is defined by a proprietary specification developed by the Home Phoneline Networking Alliance (HomePNA or HPNA)). HomePNA 2.0 (HPNA v2 or simply v2) utilizes a distributed multiple access technique for sharing an HN communications medium (i.e., a telephone line) between multiple stations (STAs). As used herein, the term v2 refers to any version of the HomePNA specification having a version number beginning with 2. For example, a HomePNA version number 2.03 or version number 2.1 can simply be referred to as "v2". Also, a station (STA), as used herein, means any device containing an "adaptor" for allowing the device to communicate over the HN medium. As used herein, an adaptor adapts data for transmission on an HPN medium.

The HPNA v2 distributed multiple access technique supports prioritized access so that time-critical information, such as packets relating to a telephony application, can receive priority over information that is less time-critical, such as packets relating to a web browsing application. While the distributed method of HPNA v2 provides the advantages of "differentiated services" via prioritization, HPNA v2 does not provide a mechanism for enforcing traffic/capacity allocation on the medium. HPNA v2 is also inefficient because packets from different stations can collide, thereby consuming time on the medium without conveying any information.

Consequently, what is needed is a way for enforcing traffic/capacity allocation on an HN communication medium. Additionally, what is needed is a way to make an HN communications medium more efficient by avoiding or reducing packet collisions. Lastly, what is needed is a way for a station operating in a decentralized multiple access environment, such as an HPNA networking environment, to gain priority access in a centralized manner to an HPN communications medium over a v2 STA existing in the same HPN networking environment.

BRIEF SUMMARY OF THE INVENTION

The present invention provides a way for enforcing traffic/capacity allocation on an HN communication medium. Additionally, the present invention provides a way to make an HN communications medium more efficient by avoiding or reducing packet collisions. The present invention also provides a way for a station operating in a centralized multiple access environment, such as an HPN networking environment, to gain priority access to an HN communications medium over a v2 STA existing in the same HN networking environment.

The advantages of the present invention are provided by a method and a system for providing access to a communications medium that is suitable for allowing use of HPNA v2-formatted frames, such that each HPNA v2-formatted frame is timed to allow a plurality of physical layer priority level slots. According to the invention, a list of sessions in enhanced STAs using the communications medium is maintained at a Media Control Station (MC STA). Each enhanced STA is an MC STA or a non-Media Control Station (non-MC STA), and gains access to the communications medium in a centralized manner. A message is transmitted from the MC STA to at least one selected non-MC STA using the communications medium, such that the transmitted message is transmitted with a highest physical layer priority level available in a first HPNA v2-formatted frame. After the message is received at a non-MC STA, the non-MC STA transmits a reply message to the MC STA in response to the received message that is transmitted at the highest physical layer priority level available in a second HPNA v2-formatted frame.

Another aspect of the invention provides an MC STA for a communications network. The communications network includes a communications medium that is suitable for allowing use of a plurality of HPNA v2-formatted frames, and such that each HPNA v2-formatted frame is timed to allow a plurality of physical layer priority level slots. The MC STA includes a QoS (Quality of Service) management entity (QME) and an admission control entity (ACE). The QME receives at least one end-to-end QoS message characterizing a user application that includes at least one QoS parameter set that is expressed at a layer that is higher than the Media Access Control (MAC) sublayer of an HPNA v2 network and is to be passed down to the MAC sublayer of the MC STA for enabling QoS traffic transport of the application. The ACE performs a centralized admission control decision relating to the application based on the at least one end-to-end QoS message characterizing the application. The MC STA maintains a list of sessions in enhanced STAs using the communications medium. Each enhanced STA is one of the MC STA or a non-MC STA, and gains access to the communications medium in a centralized manner. The MC STA transmits a message to at least one selected non-MC STA using the communications medium that is transmitted at a highest physical layer priority level available in a first HPNA v2-formatted frame. The MC STA receives a reply message from at least one selected non-MC STA in response to the transmitted message that starts at a highest physical layer priority level available in a second HPNA v2-formatted frame.

Yet another aspect of the invention provides a method and a system for providing access to a communications medium that is suitable for allowing use of a plurality of HPNA v2-formatted frames, and such that each HPNA v2-formatted frame is timed to allow a plurality of physical layer priority level slots. Each HPNA v2 STA that is associated with the communications medium is remapped at the link sublayer so that no data packet from an upper layer in each HPNA v2 STA is mapped to the highest physical layer priority level of a MAC sublayer of each HPNA v2 STA. An MC STA then transmits a message to at least one selected non-MC STA that is transmitted at a highest physical layer priority level available in a first HPNA v2-formatted frame. The MC STA also receives a reply message from at least one selected non-MC STA in response to the transmitted message from the MC STA, such that the received message starts at a highest physical layer priority level available in a second HPNA v2-formatted frame.

BRIEF DESCRIPTION OF THE DRAWINGS

The present invention is illustrated by way of example and not by limitation in the accompanying figures in which like reference numerals indicate similar elements and in which:

FIG. 1B depicts an exemplary sequence of HPNA enhanced frames illustrating preferential access to an HN communications medium according to a first embodiment of the present invention;

FIG. 1C depicts another exemplary sequence of HPNA v2 and enhanced frames illustrating preferential access to an HN communications medium according to the first embodiment of the present invention;

FIGS. 2A and 2B depict an exemplary sequence of HPNA v2 and enhanced frames illustrating preferential access to an HN communications medium according to an alternative configuration of the first embodiment of the present invention;

DETAILED DESCRIPTION OF THE INVENTION

Figure 1A:
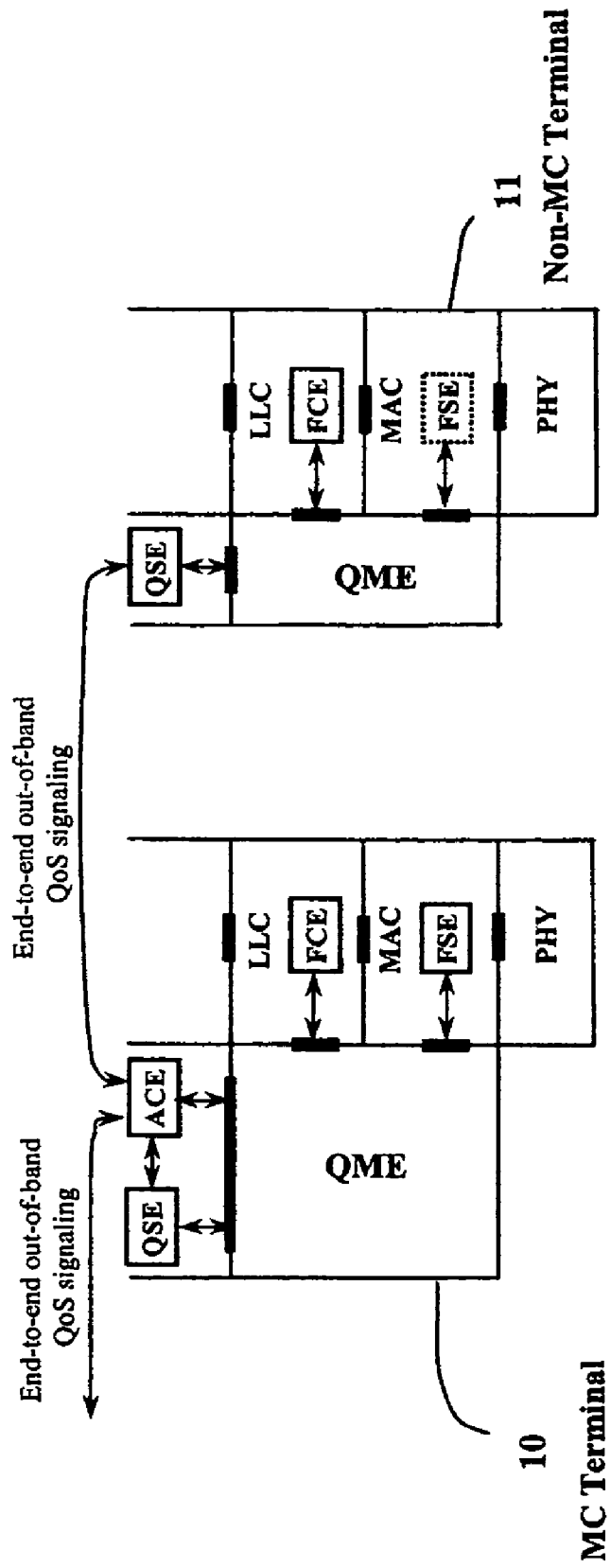
FIG. 1A shows an architectural reference model for an MC STA and for a non-MC STA in an HPNA communications environment according to the present invention; (Label "MC STA" and "Non-MC STA")

The present invention is primarily directed to Home Networking (HN) technologies that use telephone lines for implementing home networks. In that regard, the present invention provides techniques that can be used so that an enhanced Home Phoneline Network (HPN) station (HPN STA) can gain preferential access in a centralized manner to an HPN communications medium in the presence of at least one v2 HPNA STA operating in a distributed access HPNA environment.

As used herein, a "v2 HPNA STA", or a "v2 STA", is an STA that operates in accordance with any HPNA v2 specification, and does not operate in accordance with a newer HPNA specification. Also, as used herein, a STA utilizing at least one of the techniques of the present invention for gaining preferential access to a communications medium in a centralized manner in the presence of at least one v2 HPNA STA in an HPN environment is an "enhanced" STA. That is, the term "enhanced", as used herein, is used to readily distinguish an aspect or concept of an HN system, such as an enhanced MC (Media Controller) STA, an enhanced non-MC STA, an enhanced frame structure, etc., that is in accordance with the techniques of the present invention from a corresponding aspect or concept of an HPNA v2 HN system. It should be understood that each enhanced STA also has the ability to utilize an HPNA v2 protocol.

The medium access techniques of the present invention may be used by an enhanced STA separately or in combination for gaining preferential access to the HN communications medium. Additionally, the preferential medium access techniques of the present invention can be used in conjunction with the centralized medium access techniques disclosed by U.S. patent application Ser. No. 09/616,900, now U.S. Pat. No. 6,862,270 entitled "An Architectural Reference Model For QoS-Driven Wireless LANs," invented by J.-M. Ho; to U.S. patent application Ser. No. 09/616,901, now U.S. Pat. No. 6,804,222 entitled "An In-Band QoS Signaling Reference Model for QoS-Driven Wireless LANs," invented by W. Lin and J.-M. Ho; to U.S. patent application Ser. No. 09/617,083, now U.S. Pat. No. 7,151,762 entitled "Virtual Streams for QoS-Driven Wireless LANs," invented by J.-M. Ho and W. Lin; to U.S. patent application Ser. No. 09/616,897, now U.S. Pat. No. 6,970,422 entitled "Admission Control for QoS-Driven Wireless LANs," invented by W. Lin and J.-M. Ho; to U.S. patent application Ser. No. 09/616,896, entitled "Frame Classification for QoS-Driven Wireless LANs," invented by J.-M. Ho and W. Lin; to U.S. patent application Ser. No. 09/617,493, now U.S. Pat. No. 6,850,981 entitled "Frame Scheduling for QoS-Driven Wireless LANs," invented by J.-M. Ho and W. Lin; to U.S. patent application Ser. No. 09/617,494, now U.S. Pat. No. 6,999,442 entitled "RSVP/SBM Based Down-Stream Session Setup, Modification, and Teardown for QoS-Driven Wireless LANs," invented by J.-M. Ho and W. Lin; to U.S. patent application Ser. No. 09/616,878, now U.S. Pat. No. 7,068,632 entitled "RSVP/SBM Based Up-Stream Session Setup, Modification, and Teardown for QoS-Driven Wireless LANs," invented by J.-M. Ho and W. Lin; to U.S. patent application Ser. No. 09/617,440, now U.S. Pat. No. 6,950,397 entitled "RSVP/SBM Based Side-Stream Session Setup, Modification, and Teardown for QoS-Driven Wireless LANs," invented by J.-M. Ho and W. Lin; and to U.S. patent application Ser. No. 09/616,885, now U.S. Pat. No. 7,068,633 entitled "Enhanced Channel Access Mechanisms for QoS-Driven Wireless LANs," invented by J.-M. Ho; to U.S. patent application Ser. No. 09/617,439, now U.S. Pat. No. 7,031,287 entitled "Centralized Contention and Reservation Request for QoS-Driven Wireless LANs," invented by J.-M. Ho and W. Lin; to U.S. patent application Ser. No. 09/616,884, now U.S. Pat. No. 7,039,032 entitled "Multipoll for QoS-Driven Wireless LANs," invented by J.-M. Ho and W. Lin; each filed Jul. 14, 2000, and each of which is incorporated by reference herein. Additionally, the present application is related to U.S. patent application Ser0 No. 09/596,712, now U.S. Pat. No. 6,747,959, entitled "Voice-Data Integrated Multiaccess By Self-Reservation and Blocked Binary Tree Resolution," invented by J.-M. Ho and filed Jun. 19, 2000; and U.S. patent application Ser. No. 09/597,392 now U.S. Pat. No. 6,963,545, entitled "Voice-Data Integrated Multiaccess By Self-Reservation and Stabilized Aloha Contention," invented by J.-M. Ho, and filed Jun. 19, 2000, each of which is incorporated by reference herein.

The centralized medium access protocols disclosed by these incorporated-by-reference patent applications are specifically for use with the IEEE-802.11 protocol, and are collectively referred to herein as MediaPlex-type medium access protocols or, simply, MediaPlex-type protocols. For the example, the MediaPlex-type protocol channel access techniques that can be implemented with the present invention include the MediaPlex-type polling techniques, the MediaPlex-type Centralized Contention (CC) and Reservation Request (RR) techniques, and the Ack policies. MediaPlex-type polling techniques that can be used include single frame polling, multiframe polling and scheduled polling with Transmission Duration (TD). Acknowledgement policies that can be used include Positive Acknowledgement, Negative Acknowledgement, No Acknowledgement, Sequence Acknowledgement, Delayed Acknowledgement, and Piggybacked Acknowledgements.

Generally speaking, the MediaPlex-type protocol disclosed in the above-incorporated by-reference patent applications is an IEEE-802.11-based communications network that includes a Point Coordinator (PC) station (STA) that determines when an individual STA gains access to a communications medium. That is, a STA uses the communications medium for transmission after permission has granted to the STA by the PC. While the IEEE-802.11 standard provides a contention-based mechanism for asserting the presence of a new STA within an IEEE-802.11 network, all actual data communications (and potentially all network management messages as well) occur without contention under the control of the PC STA. The PC STA polls a non-PC STA for information or, alternatively, sends a data frame having an embedded (piggybacked) poll to a non-PC STA. Frame acknowledgements for prior frame transfers may also be piggybacked. Alternatively, the PC transmits a fixed schedule, or a standalone Upstream Bandwidth Allocation Medium Allocation Packet (MAP), as in DOCSIS-like approach, containing information relating to STAs that can use the medium and when such STAs can use the medium. Additional rules may be established for enhancing efficient use of the medium. When the MAP is transmitted as one of several "elements", as in an IEEE 802.11-like approach, then the MAP is more properly referred to as a Medium Allocation Element (MAE).

It should be understood that an enhanced STA is capable of utilizing a MediaPlex-type protocol. Thus, according to the present invention, once an enhanced HPNA STA has gained access to an HN communications medium, MediaPlex-type protocols and technique can be used for facilitating communications between enhanced STAs. The enhanced HPNA STA that controls the medium access is referred to herein as Media Controller (MC) STA. The MC STA corresponds to the PC STA of the MediaPlex protocol in an 802.11-based communications network. Each contention-free transfer of data of a MediaPlex-type protocol is referred to herein as a Contention-Free Burst (CFB). A sequence of CFBs is referred to herein as a "Contention Free Period" (CFP). A MediaPlex-type protocol preferably would be implemented primarily in the CFP. CFBs and CFPs would be interspersed with periods when a v2 STA (as well as STA performing a MediaPlex-type protocol) may be allowed to contend for the medium using a contention-based protocol. A period when a contention-based protocol is used for data transfer is referred to as a Contention Period (CP). Even though the framing structure of a MediaPlex-type protocol does not require a beacon or periodic superframe, a pseudo-periodic superframe or pseudo-periodic CFP can be created by designing the frame scheduling entity to force the MC to gain access to the media periodically regardless whether any traffic is pending at the MC.

FIG. 1A shows an architectural reference model for a Media Controller station (MC STA) 10 and an enhanced non-MC STA 11 for an HPN environment according to the present invention. While only one enhanced non-MC STA 10 is shown in FIG. 1A, it should be understood that any number of non-MC STAs could be part of the HPN environment shown in FIG. 1A. Moreover, while no v2 STAs are shown in the HPN environment of FIG. 1A, it should be understood that the HPN environment shown in FIG. 1A can include one or more v2 STAs.

MC STA 10 includes an admission control entity (ACE) that is part of a QoS (Quality of Serivce) management entity (QME). Alternatively, the ACE can be a separate entity that operates in conjunction with the QME. MC STA 10 also includes a frame classification entity (FCE) that is logically located in a logical link control (LLC) sublayer of MC STA 10. The QME interfaces with the FCE, which maintains a frame classification table containing frame classifiers that are used for identifying QoS parameter values associated with a frame. MC STA 10 further includes a frame scheduling entity (FSE) that is logically located at a medium access control (MAC) sublayer of MC STA 10. The QME interfaces with the FSE, which maintains a frame scheduling table that contains scheduling information for scheduling transmission of frames. The FSE also interfaces with a conventional HPNA physical layer.

Non-MC STA 11 includes a local QME that interfaces with a local FCE. The local FCE is logically located at the LLC sublayer of non-MC STA 11 and maintains a local frame classification table. Non-MC STA 11 can optionally include a local FSE (shown in a dotted border) that, when included in non-MC STA 11, is logically located at the MAC sublayer of non-MC STA 11, and maintains a local frame scheduling table for non-MC STA 11. The FSE of non-MC STA 11, when included in the non-MC STA, interfaces with a conventional HPNA physical layer.

End-to-end QoS signaling messages of a session or an application (session/application), such as a voice call, a video call, a data call and a multimedia call, are generated by the QSEs of enhanced STAs in an HPN environment and/or from outside the HPN environment. The end-to-end QoS signaling messages may indicate whether a session/application is being set up, modified, or torn down. Based on the end-to-end QoS signaling messages and local policy, the ACE makes an admission control decision for a session/application that is being set up. An FCE, whether located within MC STA 10 or a non-MC STA 11, classifies frames passed down to the LLC sublayer to the corresponding queues in the MAC sublayer. The FSE of MC STA 10 schedules transmission opportunities (TOs) by sending a poll frame to a specific non-MAC STA based on the QoS parameter. The FSE of a non-MC STA chooses data frames from its local queues based on the QoS parameter values of those frames in the queue for transmission over the TOs scheduled by the MC STA.

A first embodiment, or technique, of the present invention utilizes HPNA physical priority level 7 (PRI 7) of the MAC sublayer of an HPNA 2.0 network for providing preferential access for an enhanced HPN STA to an HPN communications medium in the presence of at least one v2 STA. FIG. 1B depicts an exemplary sequence of HPNA v2 frames 101-104 illustrating preferential access to an HPN communications medium according to a first embodiment of the present invention. The top portion of FIG. 1B depicts the actual traffic appearing on the HPN medium, while the bottom portion of FIG. 1B depicts pending traffic conditions from which the actual traffic is generated. For example, prior to frame 101, the MC STA has PRI 7 traffic pending, one v2 STA has PRI 5 traffic pending, and another v2 STA has PRI 2 traffic pending. As can be seen in FIG. 1B, the present invention uses the same framing and timing structure as specified by HPNA 2.0, which, following a transmission, includes an Inter-Frame Gap (IFG), three Backoff Signal Slots, and eight Priority Slots. The Backoff Signal Slots are used for contention resolution after a collision, and the Priority Slots are used for indicating pending traffic of a specific priority level.

According to the first embodiment of the present invention, an upper layer protocol in an enhanced Media Control (MC) STA remaps the priorities of all v2 STAs in the network at the link sublayer so that none of the data packets from an upper layer in a v2 STA is mapped to physical priority level 7 (PRI 7) of the MAC sublayer. A MediaPlex-type protocol or another centralized medium access protocol can be implemented within the priority level 7 slot for providing preferential access to the HN communications medium.

In the exemplary frame sequence shown in FIG. 1B, there is pending traffic from the MC STA and v2 STAs before the start of frame 101. The MC STA gains access to the HPN medium through PRI 7 because the v2 STAs have PRI 5 and PRI 2 traffic. In frames 101 and 103, an enhanced MC STA transmits a polling frame, a data frame, or a management frame to at least one selected enhanced non-MC STA in the PRI 7 slot. Because traffic is transmitted in the PRI 7 slot, the PRI 6-PRI 0 do not occur in either of frames 101 or 103 according to the HPNA 2.0 specification. In frames 102 and 104, an enhanced non-MC STA responds to the polling frame in the PRI 7 slot. Accordingly, the PRI 6-PRI 0 slots do not occur in frames 102 and 104.

The enhanced MC STA uses the Frame Scheduling Entity (FSE) of the enhanced MC for allocating bandwidth for an enhanced non-MC STA for achieving the QoS requirement for each active stream or session. Bandwidth requirements are communicated using either the standard HPNA v2 access method, or preferably by using a MediaPlex-type contention control/reservation request (CC/RR) mechanism. Periods of controlled contention for RR frames may be realized by using the v2 Distributed access technique at PRI 7 for RR frames only.

Thus, FIG. 1B shows that a v2 STA can be prevented from gaining access to the HPN communication medium when an enhanced STA uses the PRI 7 slot for transmission. Moreover, the present invention is backward compatibility with v2 STAs.

FIG. 1C depicts another exemplary sequence of HPNA v2 frames 105-107 illustrating preferential access to an HPN communications medium according to the first embodiment of the present invention. The top portion of FIG. 1D depicts the actual traffic appearing on the HPN medium, while the bottom portion of FIG. 1D depicts pending traffic conditions from which the actual traffic is generated. For example, prior to frame 105, one v2 STA has PRI 5 traffic pending and another v2 STA has PRI 2 traffic pending. In frame 105, the PRI 7 slot indicates that there is no traffic for an enhanced STA; consequently, a PRI 6 slot occurs. Because there is no traffic indicated in the PRI 6 slot, a PRI 5 slot also occurs. For this particular example, a v2 STA sends a message in PRI 5 slot and, consequently, priority slots PRI 4-PRI 0 do not occur. In frame 106, an enhanced MC STA has pending traffic and transmits a polling frame, a data frame, or a management frame in the PRI 7 slot to at least one selected enhanced non-MC STA (i.e., the frame could be for a broadcast or multicast address). Because traffic is transmitted in the PRI 7 slot, the PRI 6-PRI 0 do not occur in frame 106. In frame 107, an enhanced non-MC STA responds to the polling frame in the PRI 7 slot. In frame 108, only one v2 STA has pending PRI 2 traffic and transmits a packet in the PRI 2 slot. FIG. 1C also shows that a v2 STA can be prevented from gaining access to the HPN communication medium when enhanced STA use the PRI 7 slot for transmission.

In the situation in which an upper layer protocol in an enhanced MC STA is unable to remap the priorities at the link sublayer of all v2 STAs so that data packets from the upper layers in a v2 STA can still be mapped to physical priority level 7 of the MAC sublayer, the present invention provides an alternative approach for providing preferential access to an HPN communications medium for an enhanced STA in the presence of at least one v2 STA.

FIGS. 2A and 2B depict an exemplary sequence of HPNA v2 frames illustrating preferential access to an HN communications medium according to an alternative configuration of the first embodiment of the present invention. The top portion of each of FIGS. 2A and 2B depict the actual traffic appearing on the HPN medium, while the bottom portion of each of FIGS. 2A and 2B depict pending traffic conditions from which the actual traffic is generated. Prior to frame 201, an enhanced MC STA has PRI 7 traffic pending for transmission. Also as shown, a v2 STA has PRI 6 pending traffic prior to frame 201, but the enhanced MC STA gains access to the HPN communications medium and transmits a polling frame, a data frame, or a management frame in the PRI 7 slot to at least one selected enhanced non-MC STA. Thus, there are no collisions in frame 201.

Prior to frame 202, a v2 STA has PRI 7 and the polled enhanced non-PC STA has PRI 7 traffic pending in response to the polling frame. Additionally, yet another v2 STA has PRI 6 pending traffic for transmission. The v2 STA having PRI 7 traffic pending transmits in the PRI 7 slot, resulting in a collision. (While the response to the polling frame and the v2 STA PRI 7 slot transmissions are shown sequentially for convenience, the collision would be more properly shown if at least a portion of each of the two transmissions was overlapping.) The polled enhanced non-MC STA also responds in PRI 7 slot. These two STAs collide in PRI 7 slot in frame 202. Frame 202 ends when the collision is detected, and subsequent frame 203 is used for contention resolution. According to the invention, an enhanced STA always chooses signal slot 0 during contention resolution, as shown in frame 203, regardless of whether the enhanced STA issued a polling frame, responded to a polling frame, or broadcasted an enhanced HPN management frame when the collision occurred. The specific operation performed by an enhanced STA of selecting signal slot 0 during contention resolution will be termed herein as an enhanced Contention Resolution Protocol (enhanced CRP) operation.

An enhanced STA does not randomly choose any of the CRP slots when the enhanced CRP protocol according to the invention is implemented. Instead, an enhanced STA always chooses signal slot 0 during contention resolution for CFP frames. In contrast, a colliding v2 STA randomly chooses signal slot 0, signal slot 1 or signal slot 2. When the v2 STA chooses signal slot 1 or signal slot 2, the enhanced STA is able to gain access to the HPN communications medium immediately, as shown in frame 204, because the enhanced STA performs the enhanced CRP operation of the present invention (i.e., selecting signal slot 0). When an enhanced STA uses priority level 7 for any other purpose other than issuing a polling frame, responding to a polling frame, or broadcasting an enhanced HPNA management frame, the enhanced STA follows the standard HPNA v2 Contention Resolution Protocol (CRP). Note that an Enhanced STA transmitting frames for the "contention period" (CP) as defined in with respect to the MediaPlex protocol would practice the standard CRP, not the enhanced CRP. In frame 205, the v2 STA transmits the PRI 7 traffic that collided with the enhanced STA in frame 202. Prior to frame 206, the MC STA has PRI 7 traffic pending. There is no collision in frame 206 because there is pending PRI 6 traffic from a v2 STA and the MC STA has preferential access to the HPN communications medium.

When no enhanced STA has traffic and two v2 STAs have pending traffic, each v2 STA contends for access to the HPN communications medium using conventional HPNA v2 techniques.

Yet another alternative configuration for the first embodiment of the present invention provides for a pre-assignment of unique CRP sequences to some or all v2 STAs for some or all priority levels. For example, at the beginning of an enhanced CRP, a v2 STA selects a pre-assigned CRP slot, such as slot 1. In the event that the contention is not resolved, the v2 STA selects another pre-assigned CRP slot according to a pre-defined slot selection sequence, such as slot 2, and so on until the contention is resolved. At the start of each new CRP, a v2 STA implementing this alternative configuration of the first embodiment of the present invention resets to the beginning of pre-assigned CRP slot selection sequence. Alternatively, a plurality of pre-assigned CRP slot selection sequences can be associated with a v2 STA so that the v2 STA rotates through the pre-assigned slot selection sequences as CRPs are processed, thereby providing bounded delays for CRP, as opposed to the loose statistical bounds of the basic v2 protocol.

For this alternative configuration of the first embodiment of the present invention, no HPNA v2 STA is assigned a CRP slot selection sequence of all zeros when a v2 STA uses priority level 7 in the presence of an enhanced STA. Alternatively, no CRP slot selection sequence that starts with a zero would be assigned to v2 STA, thereby reducing potential jitter for traffic from an enhanced STA. This particular alternative approach guarantees that an enhanced STA will always have priority over a v2 STA for gaining access to a HPN communication medium. When, however, the communication medium is in use by a v2 STA, an enhanced STA must wait until the v2 STA completes transmission. Because the v2 HPNA frames are limited in duration to a reasonable maximum length (of time) there should not be an issue regarding delay or jitter for an enhanced STA.

As yet another alternative configuration of the first embodiment of the present invention, some or all enhanced STAs can have a pre-assignment of a unique CRP sequence, but as a group have medium access priority over all v2 STAs. Further, different enhanced STAs can have different pre-assigned CRP slots so that there is a priority hierarchy among the enhanced STA, but still as a group have medium access priority over all v2 STAs.

For the framing structure associated with the first technique of the present invention, no beacon message or superframe having a fixed length is required. The frame scheduling entity (FSE) of the enhanced MC STA controls timing based on the QoS parameters for each active stream, or session. It is assumed that all the enhanced HPN STAs have registered their active stream(s) with the MC STA through the CC/RR technique of a MediaPlex-type protocol, another centralized medium access control protocol, the conventional v2 HPNA contention protocol, or some other protocol for registering streams. All registered active streams are on the MC STA's polling list. Whenever there is a need for gaining access to the HPN medium for a poll, the enhanced MC STA can use any of the alternative configurations of the first embodiment of the present invention described above for gaining access to the HPN communications medium and having priority over all v2 STAs. An enhanced STA responding to polls uses the techniques of, for example, the first embodiment to gain priority access to the HPN communications medium. When an enhanced MC intends to broadcast management frames to implement a superframe, or for other purposes specific to an enhanced HPN protocol, the enhanced MC also uses the techniques of the first embodiment of the present invention for gaining priority over other STA for access to the communications medium.

A Chaff packet may also be used for allowing an STA (usually the MC STA) to introduce a packet having no destination on the communications medium purely for reserving the medium for an enhanced STA, and thereby providing a reduced-jitter access for a subsequent packet from the same enhanced STA.

In situations when it is not possible to remap link layer priorities for v2 STAs in an HPNA v2 network and a v2 STA is allowed to contend with an enhanced STA for medium access using PRI 7, medium usage can become inefficient because the HPNA v2 frame structure may consume a disproportionate amount of time in comparison to the time actual data is on the communications medium. That is, the Inter-Frame Gap (IFG), the priority slots (PRI), and the Backoff Signal Slots (SS) of the HPNA v2 frame structure may use a disproportionate share of time in comparison to the time that actual data is on the link. Moreover, the medium usage inefficiency may be magnified for the high payload bit rates contemplated for HPNA 3.0. The second embodiment of the present invention provides four frame structure manipulation techniques for providing an enhanced HPN STA with preferential access to an HPN communications medium in the presence of at least one v2 STA, and for improving medium usage efficiency.

The HPNA v2 specification does not specify the response of a v2 STA under certain circumstances. HPNA v2.0 specifies an IFG having a duration of 29 μsec. Additionally, HPNA 2.0 specifies that a v2 STA must assert a Carrier Sense (CS) signal for indicating an unsynchronized MAC within 12 μsec of the first valid preamble symbol. An unsynchronized MAC is a MAC that has not detected the start of a packet by the end of the last formal PRI 0 slot. The desired behavior of Carrier Sense when the MAC is synchronized or detects a frame in "error" is not specified in the HPNA 2.0 Specification, except that the Carrier Sense must be asserted as long as a frame having a valid frame format is detected. The conditions for de-asserting CS are also not stated by the HPNA 2.0 Specification. It may be assumed that when a frame in error is detected, medium synchronization is lost, and the MAC becomes unsynchronized.

The conventional HPNA v2 protocol also uses an End of Frame (v2 EOF) sequence for indicating when a frame ends and, thus, providing an indication of the duration of the frame. The conventional HPNA v2 protocol preamble plays an important role in recognizing the start and end of a v2 frame (and, thus, frame duration). Information derived from both the v2 EOF sequence and the preamble is used for identifying valid v2 frame formats. The second embodiment of the present invention overcomes the potential medium usage inefficiency of the v2 protocol, while allowing an enhanced STA to gain priority over a v2 STA by manipulating the HPNA 2.0 frame structure, such as by adjusting the size of the IFG, changing the End Of Frame (EOF) sequence, and/or changing the header/preamble encoding. Additionally, a Transmission Duration (TD) field can be added to the header/preamble that explicitly sets forth the duration of a frame.

The second embodiment of the present invention provides the following four frame structure manipulation techniques:

1) using a shortened IFG (SIFG);

2) using a different EOF sequence for an enhanced STA (enhanced EOF);

3) using a different preamble sequence for an enhanced STA (enhanced preamble); and 4) explicitly indicating the frame duration using a TD field near the beginning of the frame.

The different frame structure manipulation techniques of the second embodiment of the present invention may provide different likelihoods that a v2 STA will contend for medium access depending on how the v2 STA has been implemented. Potential likelihood of a v2 STA contending for medium access for the frame structure manipulations of the second embodiment of the present invention are summarized in Table 1.

| Frame Structure Manipulation Technique | Manipulated Frame Structure Parameter | Enhanced Frame Sequence Duration Constraint | No v2 Contention When SIFS = 17 μsec | No v2 Contention When SIFS → 0 |
|---|---|---|---|---|
| 1 | SIFG | Least likely | Maybe | Maybe in Special Cases |
| 1 + 2 | SIFG + enhanced EOF | Maybe | Maybe | Maybe in Special Cases |
| 1 + 3 | SIFG + enhanced Preamble | Maybe | Maybe | Maybe in Special Cases |
| 1 + 4 | SIFG + TD Field | Maybe | Maybe | More likely |
| 1 + 2 + 3 | SIFG + enhanced EOF + enhanced Preamble | More Likely | More Likely | Maybe in Special Cases |
| 1 + 2 + 4 | SIFG + enhanced EOF + TD Field | More likely | More likely | More likely |
| 1 + 3 + 4 | SIFG + enhanced Preamble + TD Field | More likely | More likely | More likely |
| 1 + 2 + 3 + 4 | SIFG + enhanced EOF + enhanced Preamble + TD Field | Most likely | Most likely | Most likely |

Figure 3:
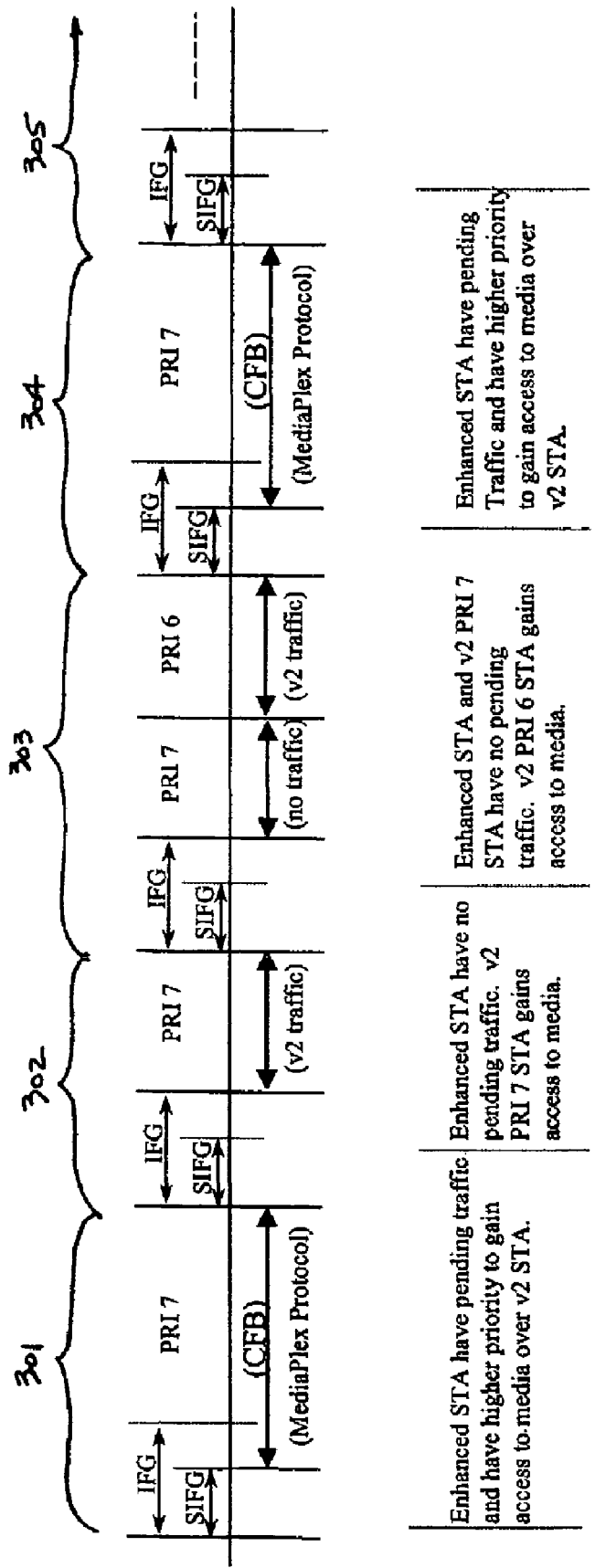
FIG. 3 depicts an exemplary sequence of HPNA frames that includes enhanced HPNA frames for providing preferential access to an HN communications medium according to a first frame structure manipulation technique of a second embodiment of the present invention.

In view of these particular unspecified aspects of the HPNA v2 specification, the first frame structure manipulation of the second embodiment of the present invention is based on the apparent constraint that CS is assumed to be asserted within 12 μsec of the first valid preamble symbol in both synchronized and unsynchronized states of a v2 STA. In view of these constraints, the first frame structure manipulation of the second embodiment of present invention uses a shortened IFG (SIFG) having a duration of less than 17 μsec so that an enhanced STA always maintains medium access priority over v2 STA without needing to transmit v2 PRI or Backoff Signal Slots. FIG. 3 depicts an exemplary sequence of HPNA frames 301-305 that includes enhanced HPNA frames for providing preferential access to an HPN communications medium according to a first frame structure manipulation technique of the second embodiment of the present invention. Thus, by using an enhanced frame structure having an SIFG, a v2 STA might determine that a frame has started before the v2 STA attempts to contend for the medium and, consequently, will forego contention, thereby eliminating the necessity of PRI and SS slots for contention resolution and reducing overhead.

The top portion of FIG. 3 depicts the actual traffic appearing on the HPN medium with the conventional v2 HPNA frame structure overlaid on the frame structure of the present invention having an SIFG. The bottom portion of FIG. 3 depicts pending traffic conditions from which the actual traffic is generated. In frame 301, when an enhanced HPN frame having timing that includes an SIFG that is less than 17 μsec is used, Carrier Sense (CS) would be asserted in a v2 STA before the first priority slot (i.e., PRI 7), so a v2 STA would then defer to the enhanced HPN frame and would not contend for access to the HN communications medium. A Contention Free Burst (CFB) could be used during the enhanced frame structure because there would no potential for collisions on the medium. A MediaPlex-type protocol could be implemented during the CFP. Moreover, the overhead for the enhanced HPN frame structure according to the second embodiment of the present invention will be reduced in comparison to the overhead for the conventional HPNA v2 frame structure.

In frame 302, there is no enhanced HPN traffic, so a normal IFG is used for the frame. A v2 STA can then contend for medium access, as indicated by the v2 traffic in the PRI 7 slot. In frame 303, there is no enhanced HPN traffic, so a normal IFG is used for the frame. There is no v2 traffic transmitted in the PRI 7 slot, while v2 traffic is transmitted in the PRI 6 slot. Frame 304 is an enhanced HPN frame having an SIFG and a Contention Free Burst (CFB) according to the present invention. Accordingly, a MediaPlex-type protocol could be implemented in the CFB of frame 304. The portion of frame 305 shown is a normal v2 HPNA frame.

Figure 4:
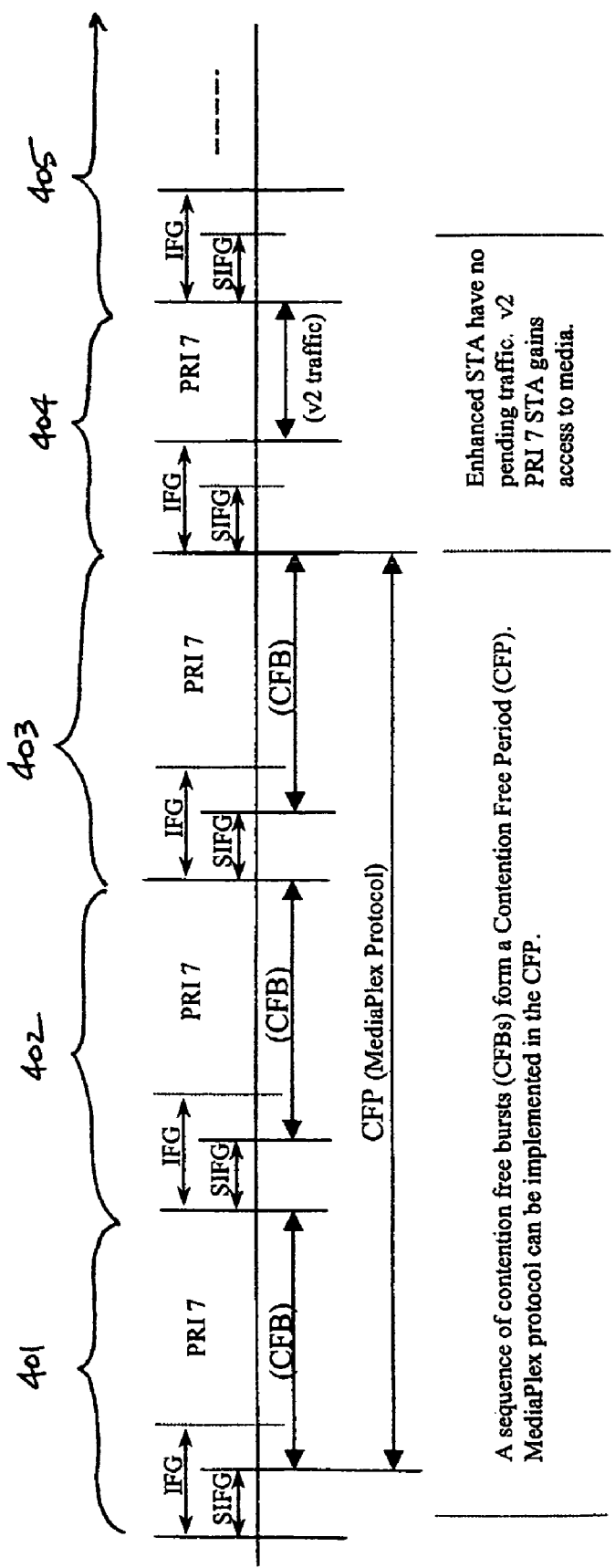
FIG. 4 depicts an exemplary sequence of enhanced HPNA frames forming a Contention Free Period (CFP) for providing preferential access to an HN communications medium according to the first frame structure manipulation technique of the second embodiment of the present invention.

FIG. 4 depicts an exemplary sequence of enhanced HPN frames 401-405 that includes a sequence of enhanced HPN frames forming a Contention Free Period (CFP) for providing preferential access to an HN communications medium according to the first frame structure manipulation technique of the second embodiment of the present invention. The top portion of FIG. 4 depicts the actual traffic appearing on the HPN medium, while the bottom portion of FIG. 4 depicts pending traffic conditions from which the actual traffic is generated. A MediaPlex-type protocol could be implemented in the each of the CFBs forming the CFP.

When sufficient processing power is available, that is, depending on the signal processing capability realized in enhanced HPN receivers, the duration of the SIFG could potentially go to zero (i.e., SIFG→0). Alternatively, when an enhanced HPN frame is known to have a fixed size, or duration, the SIFG may be made to approach zero.

Because the HPNA v2 specification does not define the operating characteristics of an STA under certain circumstances, the first frame manipulation technique of the second embodiment includes additional considerations. For example, there is the possibility that a v2 STA might recognize the start of an enhanced HPN frame (i.e., an HPN frame having an SIFG) as an early priority slot signal, instead of determining that the medium is busy. It is also possible that a particular implementation of a v2 STA causes CS to perform differently when the v2 STA is in a synchronized state. There is also a possibility that the v2 STA does not check for the medium being busy prior to detecting the first PRI slot (i.e., PRI 7). According to the HPNA v2 design, a valid CS frame also includes a time period after a frame having reduced power, and a specified time period until the start of the next frame is detected. When this does not occur, it is possible (though not probable) that a v2 STA might misinterpret and ignore the start of a subsequent enhanced frame.

Consequently, in any of these situations a v2 STA might cause interference to the enhanced HPN protocol of the present invention when only an SIFS is used. When, however, a v2 STA determines that the media is busy when the v2 STA detects the start of a frame prior to the first PRI slot and asserts CS, the enhanced protocol of the present invention can use a conventional HPNA v2 EOF sequence and header structure, eliminate the time allowed for PRI and SS frame structures between consecutive enhanced HPN frames, and operate without interference from a v2 STA. As a result, the medium efficiency will be improved over a conventional HPNA v2 frame structure.

It is also possible that a v2 STA will not recognize consecutive enhanced HPN frames, each having sufficiently small SIFG, as independent frames. When this operating characteristic for a v2 STA is present, an upper bound on the size of an SIFG can be inferred from the HPNA v2 specification for the minimum power allowed in a valid CS frame. As specified by the HPNA 2.0 specification, when the power level drops below −109 dBm during an 8 μsec window, a HPNA v2 station may de-assert carrier sense. That is, a v2 STA may infer the end of a frame. The HPNA v2 specification does not state whether the CS must be de-asserted.

The HPNA v2 specification specifies a size limit on the duration of a frame in the v2 protocol to be 4.166 msec. When the size limit is exceeded, a v2 STA may determine that a current (enhanced) HPN frame on the medium is noise, in which case the v2 STA may then determine to ignore the noise (i.e., the current (enhanced) HPN frame) and contend for access to the medium. This may not be a severe constraint, but requires the enhanced HPN protocol of the first frame manipulation technique of the second embodiment of the present invention to monitor the total duration of a plurality of concatenated frames and periodically allow for an HPN frame having timing for a longer SIFG (>8 μsec) to cause a v2 STA to recognize an EOF before the 4.166 msec limit is exceeded. Because the ability to monitor the total duration of a plurality of concatenated frames is an added processing requirement for an enhanced STA, and it may be preferable that a v2 STA recognize each enhanced HPN frame on the medium as a separate frame by selecting an appropriate SIFG duration.

There may also be an issue when consecutive enhanced HPN frames arriving at a v2 STA from different enhanced STA at respectively different power levels. A detected change in power level may cause the v2 STA to determine that the last frame has ended and, consequently, the v2 STA may try to contend for the medium (even though another enhanced frame is on the medium). This issue also depends on the ability of a v2 STA to detect the start of the frame at lower power when the v2 STA has determined that the prior frame has ended. To avoid these issues, it may be preferable that each individual enhanced frame is recognized by the v2 STA. On the other hand, depending upon system requirements, it may be advantageous that endings and beginnings of some enhanced frames are not recognized by a v2 STA, such as when using more efficient encodings for enhanced frames that are not understood by v2 STA, etc.

In situations when a v2 STA is not able to distinguish between consecutive enhanced HPN frames, a shorter IFG and/or an enhanced header that is incompatible with v2 STAs can be used. Nevertheless, the presence of a v2 EOF in an enhanced HPN frame may be sufficient to cause a v2 STA to recognize that the enhanced HPN frame has ended, even when an extremely short IFG or no IFG is used. Thus, the second frame structure manipulation technique provides an EOF sequence that is different from a conventional v2 EOF sequence, thereby avoiding the situation when a v2 STA recognizes that an enhanced HPN frame has ended based on the EOF. Of course, an enhanced STA will recognize the beginning and ending of an enhanced HPN frame, and respond accordingly.

Figure 5:
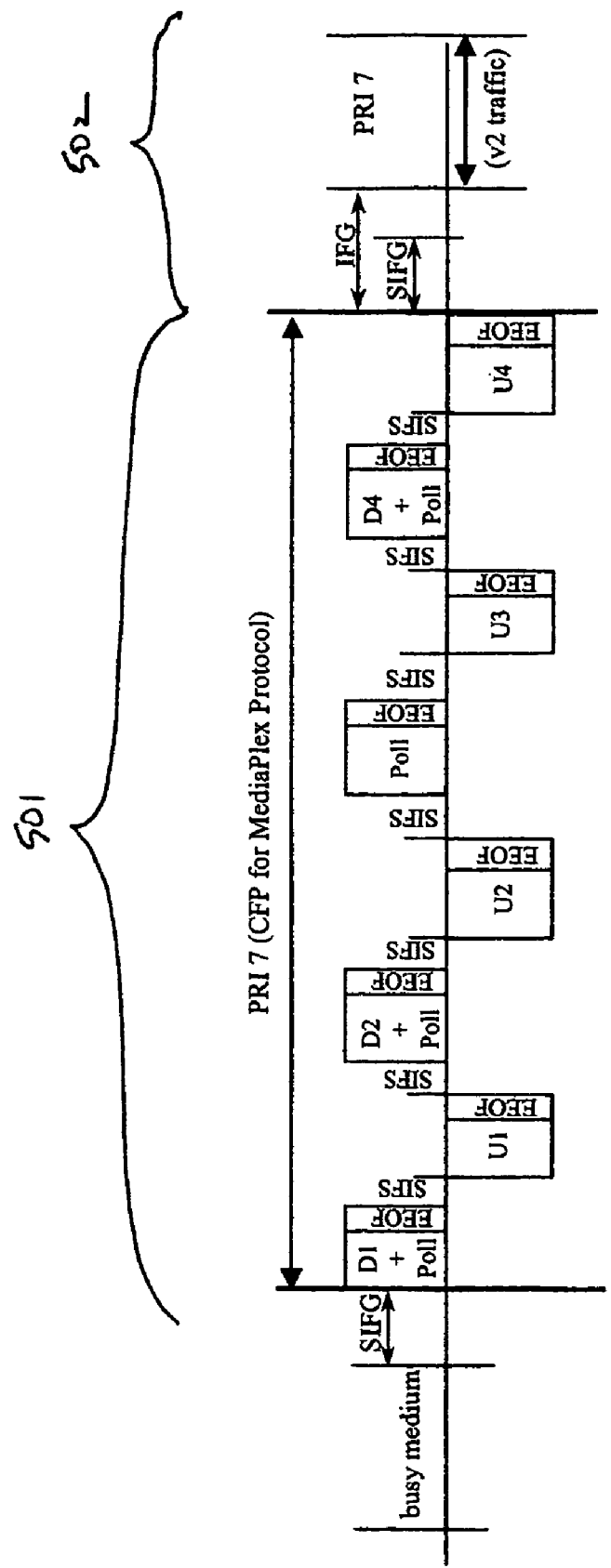
FIG. 5 depicts an exemplary sequence of HPNA frames that includes an enhanced HPNA frame having a second frame structure manipulation technique that incorporates an enhanced EOF sequence for providing preferential access to an HN communications medium according the second embodiment of the present invention.

FIG. 5 depicts an exemplary sequence of HPN frames 501 and 502 that includes an enhanced HPN frame having a second frame structure manipulation technique that incorporates an enhanced EOF (EEOF) sequence for providing preferential access to an HN communications medium according the second embodiment of the present invention. Frame 501 has timing that includes an SIFG and then a sequence of polls and responses, between an enhanced MC STA and enhanced non-MC STAs. Each poll and response includes a special enhanced EOF (EEOF) sequence that is not recognized by a v2 STA. Frame 502 depicts a normal HPNA frame having v2 traffic transmitted during the PRI 7 slot.

One possible consideration of the second frame structure manipulation technique of the second embodiment of the present invention is that the start of an enhanced HPN frame, which is identical to the start of a conventional HPNA v2 frame, appears similar to a conventional v2 EOF sequence. According to HPNA v2 design, the HPNA v2 preamble is encoded at 2 Mbaud and consists of a pattern of 16 QPSK modulation symbols that is repeated four times. The HPNA v2 design also requires that an HPNA v2 EOF consists of the first four symbol in the HPNA v2 preamble. This means that even when an enhanced EOF is used, the start of the next enhanced frame may be recognized by a v2 STA as the end of a conventional HPNA v2 frame. Consequently, when a v2 STA does not recognize a subsequent enhanced HPN frame as a valid frame, the v2 STA may contend for access to the medium. It is also possible that because the v2 preamble repeats and the CS function of a v2 STA must recognize the preamble within 4 preamble symbols (i.e., 12 µsec), the beginning of the next frame will be recognized as a conventional EOF sequence followed by a valid v2 preamble, thereby causing CS to be potentially asserted. The frame will only be declared invalid when the header is not recognized, at which point CS may be de-asserted with the result that v2 STA may contend for the medium.

In situations when it is necessary that a v2 STA should not recognize the beginning of an enhanced HPN frame (such as the start of an enhanced HPN frame or the end of an enhanced HPN frame), the third frame structure manipulation technique of the second embodiment of the present invention provides that a different preamble that is not recognizable by a v2 STA be used for an enhanced HPN transmission. Both the conventional v2 preamble and the enhanced preamble would be used to form sequences of enhanced HPN frames. The first frame of an enhanced frame sequence (or set of enhanced frame sequences) would use a v2 preamble so that a v2 STA would recognize the beginning of the enhanced frame sequence. A sufficiently short SIFG, removing or replacing the v2 EOF, or other techniques (such as a blocking signal) can be used for ensuring that the end of enhanced HPN frames are not recognized by v2 STA. During the enhanced HPN frame sequence, an enhanced preamble would be used for ensuring that a v2 STA considers the frame sequence to be a single v2 frame. When necessary, a v2 preamble would be used for allowing the v2 STA to recognize the end/start of occupancy of the HPN communications medium.

The fourth frame structure manipulation technique of the second embodiment of the present invention provides a Transmission Duration (TD) field that is added to the preamble of an enhanced frame when the duration of the enhanced frame is able to be determined sufficiently early. When the TD field is used, it is possible to shorten the IFG further or eliminate the EOF in the situation when an EOF is relied upon as an indication of the end of an enhanced frame. Moreover, the IFG might be completely eliminated (i.e., IFG→0). Elimination of the EOF and/orthe IFG depends in part on the signal processing capability in an enhanced STA, specifically with respect to elimination of the IFG. A TD field may be used for providing an indication that an enhanced HPN frame size varies from the frame size of a conventional HPN frame and so that the enhanced HPN frame size is known in advance of the end of the frame. Moreover, when a TD field is added to the header, a v2 STA will no longer recognize the enhanced HPN frame format as a valid frame format.

Further, it might be more efficient to use a TD field in the preamble of an enhanced HPN frame rather than an EOF for indicating the duration of a frame. Adding a TD field provides a system with increased robustness because as long as the packet header is correctly received, the exact time of medium occupancy is known. In that regard, the EOF sequence might not be as reliably detected as the frame header.

There are two possible responses for a v2 STA when a TD field is added to an enhanced HPN frame and used in conjunction with an SIFS. In the first possible response, the v2 STA asserts CS when an enhanced frame starts. The v2 STA may de-assert the CS, however, once it is determined that the frame does not follow a valid v2 frame format. CS is also determined at least in part by carrier power levels and by detected changes in carrier power levels. Thus, it is possible that CS will be maintained during the frame. As a second possible response, there is a possibility that CS will be de-asserted, and a v2 STA will start to contend for the medium. In this case, a TD field will not work in the presence of a v2 STA.

In the situation that a v2 STA requires an IFG between HPNA frames for, for example, channel settling, and/or that a header structure be used that is recognizable to the legacy v2 STA in all situations, the present invention provides yet a third embodiment that preserves priority access to an HPN communications medium for an enhanced HPN STA without contention with a v2 STA. According to the third embodiment of the present invention, an enhanced MC STA uses a "Blocking Signal" once the enhanced MC STA occupies the HN communications media.

All HPN STA have the capability to simultaneously listen to the medium, and generate traffic on the medium and, during priority and Backoff slots, detect and resolve collisions. HPNA v2 STAs do not rely on power or energy (power/ energy) detection alone for asserting the Carrier Sense (CS) signal. The requirements for a v2 STA to revoke a CS signal rely in part on detection of an End-of-Frame (EOF) sequence and in part on power/energy detection. Additionally, the minimum inter-frame gap between two HPNA 2.0 frames is 29 µsec and a frame from a v2 STA must be determined to be present on the medium within 12 µsec (24 symbols) of the first preamble symbol of that frame.

Figure 6:
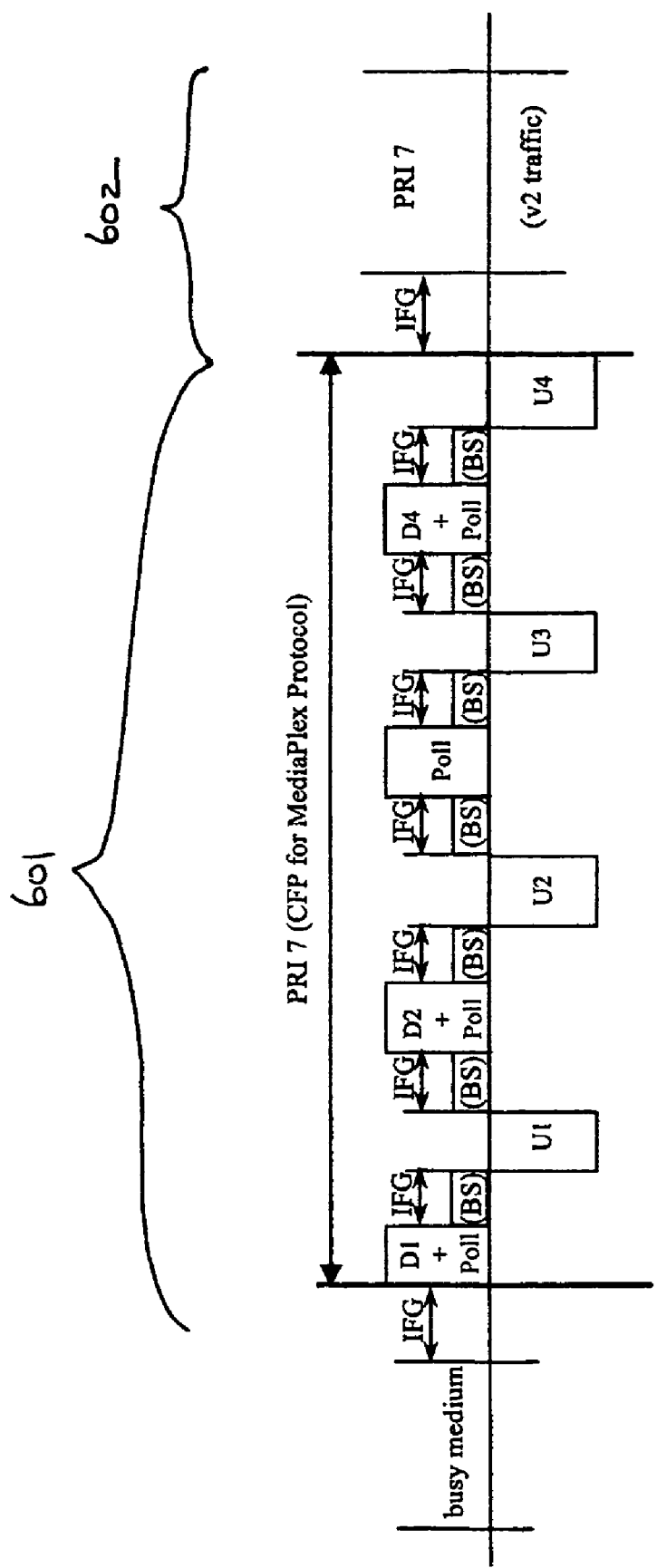
FIG. 6 depicts an exemplary sequence of HPNA frames that includes an enhanced HPNA frame incorporating a Blocking Signal for providing preferential access to an HN communications medium according to a third embodiment of the present invention.

Accordingly, an enhanced MC STA can generate a "Blocking Signal" during what would normally be the IFG, thereby preventing an HPNA v2 STA from recognizing the existence of the IFG. FIG. 6 depicts an exemplary sequence of HPN frames 601 and 602 that includes an enhanced HPN frame incorporating a Blocking Signal for providing preferential access to an HPN communications medium according to a third embodiment of the present invention. Frame 601 has timing that includes an IFG followed by a sequence of polls and responses between an enhanced MC STA and enhanced non-MC STAs. While not shown in FIG. 6, a poll can cause a sequence of frames to be sent from one enhanced non-MC STA to another enhanced non-MC STA. According to the third embodiment of the present invention, each poll and response is separated in time by an IFG containing a Blocking Signal (BS). Frame 602 depicts a normal HPNA timing and a normal HPNA v2 frame having v2 traffic transmitted during the PRI 7 slot. Note that with appropriate signal processing, the blocking signal can be extended to exist during the message frames transmitted by enhanced stations as well, if convenient. This option is not shown in FIG. 6.

Generally speaking, a valid Blocking Signal could be any waveform that would cause a v2 STA to determine the communications medium is busy, but is identifiable by an enhanced STA as a non-information bearing signal that is expressly used for spoofing a v2 STA into determining that the communications medium is busy. Thus, because a v2 STA is not able to identify an IFG having a blocking signal, the prior and following frames would appear to a v2 STA to be one larger frame.

When the third embodiment of the present invention is used during a polling frame sequence (i.e., a poll followed by response), a responding enhanced STA does not generate the priority and Backoff slots that are normally generated as part of the HPNA v2 frame structure. The responding enhanced STA would simply start transmission at the end of the Blocking Signal (or during the Blocking Signal a defined time period after the prior frame) because the enhanced STA would know a priori that the enhanced MC STA is using a spoofing technique to keep all v2 STAs from participating. The two messages (poll and response) would appear to a v2 STA to be like a single (unintelligible) message. When the enhanced STAs generates the Blocking Signal during the IFG period after the transmission, HPNA v2 STAs are prevented from accessing the medium. Subsequently, the MC STA can gain access to the medium and start to send another poll message. In this way, the medium is controlled by the enhanced STAs to create a CFP.

The framing structure of the third embodiment of the present invention maintains backward compatibility with an HPNA v2 STA. When the duration of a message from the enhanced MC STA is known (i.e., by use of a fixed length message or a DT field in the header), the next responding enhanced STA can alternatively generate the Blocking Signal rather than the enhanced MC STA.

One possible realization of a valid BS could conform to one of the valid frame formats identified in the HPNA 2.0 specification. Moreover, the frame format of the BS should also be distinctly identifiable by an enhanced STA as a blocking signal, and its frame content predetermined or derivable from a small section of the signal near the beginning of the signal. Such a frame will be termed here as a Blocking Frame (BF). If such a BS format were used, it would be necessary that the BS overlap with frames sent by enhanced STAs to be effective.

One consideration when selecting a suitable BS is that the BS may desirably exceed the duration of the maximum length of a single HPNA v2 frame so that a BF frame can be accommodated. For example, it is possible that during such a (lengthy) BS, a v2 STA might try to seize the HPN medium even though the medium is still in use by an enhanced STA. Given the required timing for a v2 STA to assert a CS signal (12 μsec) and the v2 IFG (29 μsec), a sequence of blocking frames spaced no more than 17 μsec apart (that is, 29 μsec minimum v2 IFG minus 12 μsec maximum CS determination time) should ensure that the CS signal is asserted so that the v2 STAs of an HPN network do not transmit. Thus, the BF frame spacing, which is referred to herein as the Blocking Frame Gap (BFG), can be any convenient value that is less than 17 μsec. The BFG should preferably be a known or derivable constant value for the duration of the BS, which would be formed by a sequence of BFs.

Given the timing requirements of a v2 HPNA frame, there is flexibility regarding exactly how a Blocking Frame is defined. For instance, a BF can include a Frame Type field containing information that indicates that the Blocking Frame Type (BFT) being used is a known v2 HPNA frame type. Alternatively, the BFT field can contain information indicating a frame type that is unknown to a v2 STA. As yet another alternative, the BFT field could contain information indicating a known v2 HPNA frame type and some other feature of the frame, such as a field internal to the "payload" portion of the frame that would not be interpreted by v2 STA), could be used for an enhanced STA for identifying the BF.

Yet other fields that correspond to fields in a v2 header can be specified in a BF frame header. For example, the BF frame header can contain information assigning the frame the highest HPNA priority, i.e., Priority 7. A Blocking Frame Scrambler Initialization (BFSI) field could be fixed or variable, as long as the SI field is the same for all BF in the BS. Preferably, the SI field is fixed, for example, at a value of 0. A Blocking Frame Encoding (BFE) field, corresponding to a v2 HPNA Payload Encoding (FE) field, could contain one of the existing v2 HPNA values, or to a value that is unknown to a v2 STA and understood only by an enhanced STA. A field corresponding to a Header Check Sequence (HCS) field that could be properly decoded and verified by a v2 STA would also be required. Of course, the contents of this field would depend on the settings of the other fields in the BF frame header. Additionally, a valid HCS field, corresponding to the Ethernet DA and SA fields, must also be included. Potentially, the Ethernet DA and SA fields could be assigned to specific MAC addresses, as long as those addresses are the same for all BF in the BS. Given the dependence of HCS on source address, etc., it is preferable that BFE field contains a value that is currently known to a v2 STA.

Other information specific to the BF format, such as the length of a BF frame (if not predetermined) and the number of BF frames in the sequence could be included in the BF header as long as the information is constant for all BF in the BF sequence. Alternatively, the information could change in a known manner. For example, a sequence number could be decremented in the BF when such a field is included. Finally, the data used to extend the frame to its full length, or duration, is preferably a known sequence of bits. For example, all zeros for the length of the frame. The bits should, however, also be scrambled based on the scrambling initialization field of the header.

Thus, based on the specific definition of a BF presented above, an enhanced STA can generate a BS. For example, an enhanced MC STA could transmit the BS to prevent the medium from being used by a v2 STA. Early during the BS signal, such as shortly after the first BF header or possibly even earlier, each v2 STA will recognize the format of the BS signal as a BF. The enhanced MC STA would then coordinate transmissions from other enhanced STAs over the duration of the BS. Gaps in an enhanced STA transmission can be included for facilitating recognition of the BS Preamble/Header and EOF. Gaps may not, however, be required depending on other implementation issues. For example, because the BS is known after a small portion of the first BF, a gap is fully removable by an enhanced STA regardless of the presence of other signals on the HPN medium. That is, an enhanced STA can detect and decode other enhanced STA signals that are simultaneous with the BS regardless of which particular enhanced STA originates the an enhanced HPNA signal. BS Formats other than that described here are also possible depending on implementation issues.

As an alternative to the third embodiment of the present invention, the Blocking Signal can be transmitted outside the IFG to allow other frame structures and access mechanisms to be applied exclusively by an enhanced STA, but yet maintain backward compatibility with a v2 STA. For this alternative embodiment, an enhanced STA would sample the Blocking Signal during the IFG. Accordingly, the Blocking Signal would need to be configured so that a sample would be sufficient for predicting the blocking signal during the time that the Block Signal is transmitted. Exemplary Blocking Signals that can be predicted based on a sample include a sine wave and a cosine wave. Another exemplary Blocking Signal is the BF frame format described previously.

When the Blocking Signal is configured so that it could be derived from a frame transmitted immediately prior to the IFG, the IFG would not be necessary. For instance, a period of limited contention could be created and restricted to an enhanced STA. An enhanced STA could use conventional v2 access mechanisms, complete with priority and signal slots. Subsequently, the enhanced MC would transmit the Blocking Signal. The enhanced STA (and the enhanced MC) are able to cancel the blocking signal in their receivers, thereby revealing other signals that might be present. The enhanced STA then utilizes exactly the same medium access techniques as in HPNA v2, except a v2 STA would be unable to participate because the Blocking Signal would not be cancelled in the v2 STA receiver.

Figure 7:
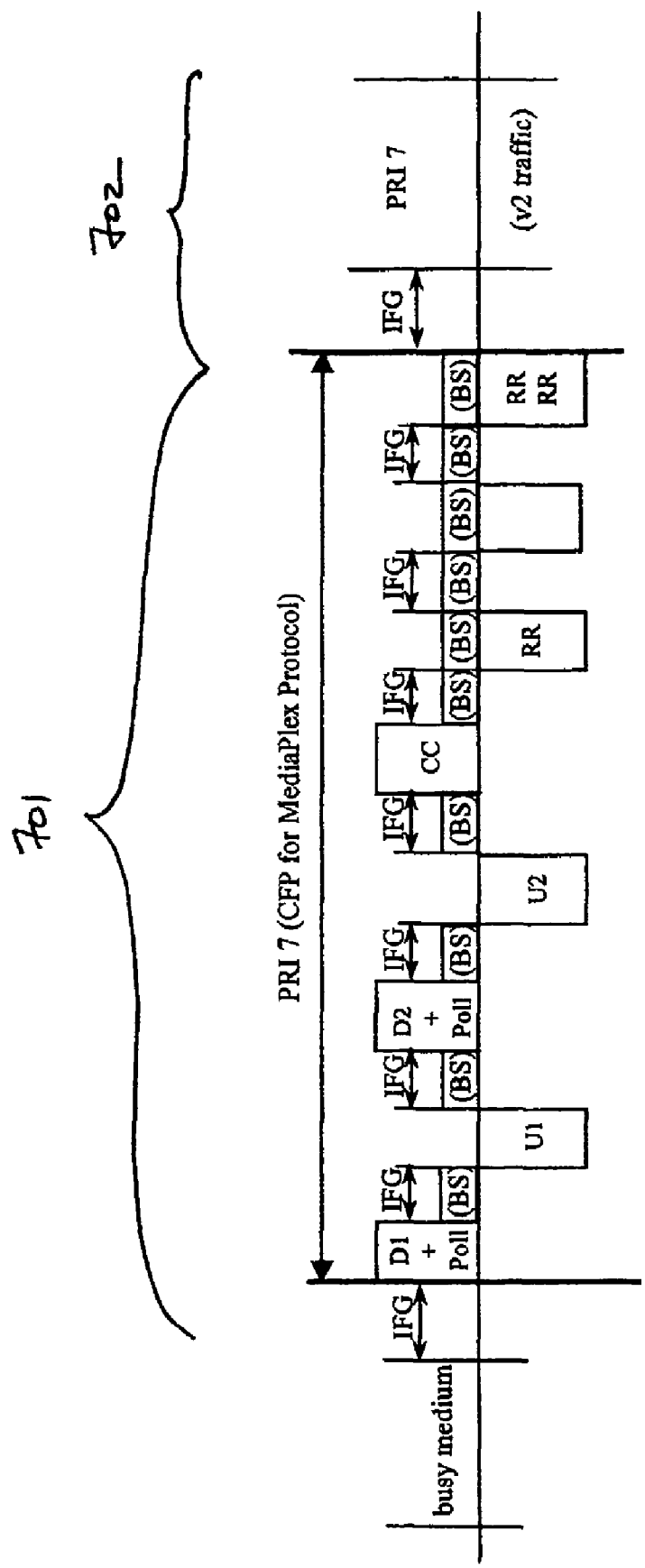
FIG. 7 depicts an exemplary sequence of HPNA frames that includes an enhanced HPNA frame incorporating a Blocking Signal that is transmitted outside the IFG for providing preferential access to an HN communications medium according to an alternative configuration of the third embodiment of the present invention.

FIG. 7 depicts an exemplary sequence of HPN frames 701 and 702 that includes an enhanced HPN frame incorporating a Blocking Signal that is transmitted outside the IFG for providing preferential access to an HN communications medium according to an alternative configuration of the third embodiment of the present invention. Frame 701 has timing that includes an IPG and then a sequence of polls and responses between an enhanced MC STA and enhanced non-MC STAs. Although not shown in FIG. 7, a poll can alternatively cause a sequence of frames to be exchanged between one enhanced non-MC STA and another enhanced non-MC STA. Additionally, a CC/RR mechanism, such as described in connection with the MediaPlex-type protocol, could be implemented during the PRI 7 slot, as shown in FIG. 7. In this example, there is one allocated RR slot that has no RR frames. Because the enhanced MC STA transmits the Blocking Signal during the period of RR slots to keep the medium busy, v2 STAs do not try to access the medium. Frame 702 depicts a normal HPNA frame timing and a normal HPNA v2 frame having v2 traffic transmitted during the PRI 7 slot. A v2 STA would operate undisturbed, but would be denied access to the channel during frame 701. An enhanced STA receiver would require additional signal processing capabilities for canceling the Blocking Signal in the receiver, but otherwise could implement whatever access mechanisms and waveforms that are desired. Further, the PHY layer of the HPN network is required to have a good echo canceller for canceling the interference that is the transmit signal from the same STA.

An enhancement to the second and third embodiments of the present invention is to implement a simultaneous two-way data transfer between an enhanced MC STA and an enhanced non-MC STA, in which after a poll header, the enhanced MC transmits a polling frame or a polling frame+data frame to a destination enhanced non-MC STA, while the destination enhanced non-MC STA simultaneously responds with a frame of its own.

According to the fourth embodiment of the present invention, a polled enhanced non-MC STA must include expected transmission duration of the reply in a TD field in the frame header so that the enhanced MC STA has information for determining when to send another frame. When the enhanced MC STA broadcasts a CC frame, a blocking signal is transmitted to cover the length of the allocated RR slots. The blocking signal is intended to prevent the v2 STA from accessing the medium when no RR is sent in an allocated RR slot.

Figure 8:
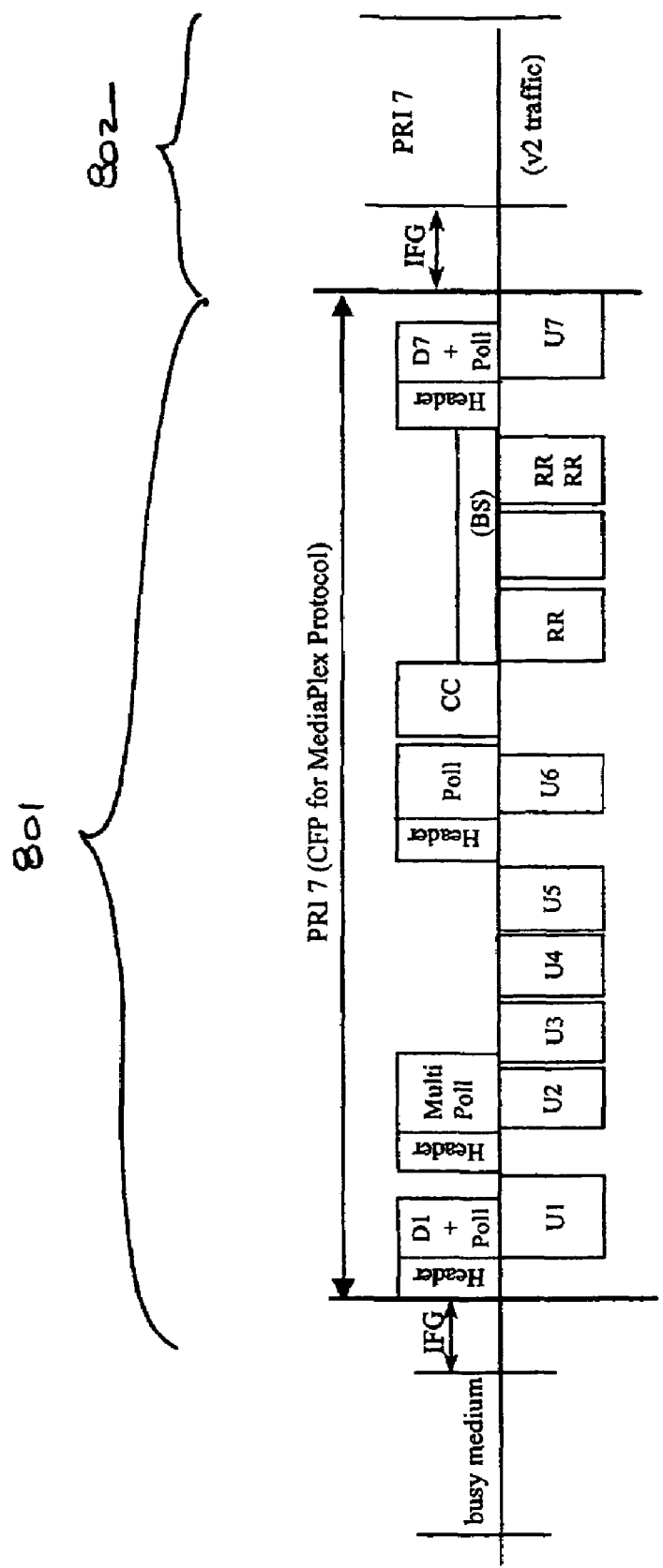
FIG. 8 depicts an exemplary sequence of HPNA frames that includes an enhanced HPNA frame incorporating a special signal for providing preferential access to an HN communications medium according to the fourth embodiment of the present invention.

FIG. 8 depicts an exemplary sequence of HPN frames 801 and 802 that includes an enhanced HPN frame for providing preferential access to an HPN communications medium according to the fourth embodiment of the present invention. Frame 801 has timing that includes an IFG followed by a sequence of polls and responses between an enhanced MC STA and enhanced non-MC STAs. As shown in FIG. 8, a poll can alternatively cause a sequence of frames to be exchanged between one enhanced non-MC STA and another enhanced non-MC STA. In this particular channel access scheme, the MC STA gains access to the HPN communication medium using a technique of the first and/or the second embodiment of the present invention. In particular the MC STA uses PRI 7. After the MC STA takes control of the medium, the MC STA and the enhanced STA transmit simultaneously after the frame header of the MC STA. During the PRI 7 slot, as shown in FIG. 8, the MC STA sends a data message D1 (where the "D" in D1 indicates a "downstream" message) and a polling message, and the polled enhanced non-MC STA simultaneously (for a portion of each message) sends a data message U1 (where the "U" in U1 indicates an "upstream" message). Immediately after the U1 message from non-MC STA ends, the MC STA transmits another frame header and a multi-poll message polling, for this example, four non-MC STAs. The polled non-MC STAs respond to the multi-poll message by sending U2, U3, U4 and U5 frames in a sequence specified in the multi-poll message. At the end of data frame U5, the MC STA transmits a header plus a polling frame. As the MC STA sends the polling frame, the non-MC STA simultaneously transmits a U6 frame in response.

A CC/RR mechanism, such as described in connection with the MediaPlex-type protocol, could also be implemented during the PRI 7 slot, as shown in FIG. 8. Note that RR frames cannot be transmitted at the same time as a CC frame because the enhanced STAs having pending RR frames need the key control information that would not be received until the end of the CC frame. During the RR slots, the MC STA broadcasts a Blocking Signal (BS) to prevent any v2 STAs from accessing the medium during, for example, an empty RR slot. Lastly during exemplary frame 801, the MC STA transmits a header, then a data message and polling message for non-MC STA U3, and the polled non-MC STA simultaneously transmits a U3 frame in response. Frame 802 depicts a normal HPNA timing and a normal HPNA v2 frame having v2 traffic transmitted during the PRI 7 slot.

When the fourth embodiment of the present invention is used in conjunction with the third embodiment of the present invention, the MC could grant the channel to two other STAs to have a simultaneous duplex exchange. For example, a STA A would transmit to a STA B, and at the same time STA B would transmit to STA A. The MC STA can transmit a blocking signal at the same time that the simultaneous duplex exchange occurs to ensure that a signal that qualifies as a "valid" signal is present at the v2 STA because the two signals transmitted by STA A and STA B may not be received at the same power level by a v2 STA. All the time that the enhanced MC STA is transmitting a blocking signal, a total of three enhanced STAs would be transmitting. Because STA A has knowledge of the signal transmitted by STA A and the blocking signal, STA A can subtract both signals from the received signal, and thereby determine the signal transmitted by STA B. Similarly, STA B can determine the signal transmitted by STA A. The HPNA v2 specification sets forth requirements for the allowed variation of power for a valid v2 signal. It may be difficult to meet the power variation constraint when an enhanced non-MC STA transmits a blocking signal instead of an enhanced MC STA.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for providing access to a communications medium, the communications medium being suitable for allowing use of Home Phoneline Network Association (HPNA) v2-formatted frames, each HPNA v2-formatted frame being timed to allow a plurality of physical layer priority level slots, the method comprising steps of:

maintaining a list of sessions in enhanced stations (STAs) using the communications medium, each enhanced STA being one of a Media Control Station (MC STA) and a non-Media Control Station (Non-MC STA), and each enhanced STA gaining access to the communications medium in a centralized manner, at least one enhanced STA adapted to always choose a Backoff Signal Slot 0 of an HPNA v2 frame during contention resolution with an HPNA v2 station, the Backoff Signal Slot 0 is one of only three Backoff Signal Slots specified under HPNA v2 for use in contention resolution after a collision; and transmitting a message from the Media Control Station (MC STA) to at least one selected non-MC STA using the communications medium, the transmitted message being transmitted with a highest physical layer priority level available in a first HPNA v2-formatted frame.

2. The method according to claim 1, wherein a frame encoding of at least one HPNA v2-formatted frame is modified to allow a higher encoding rate than permitted by HPNA v2.

3. The method according to claim 1, wherein a frame header encoding of at least the first HPNA v2-formatted frame is modified to allow one of a polling frame, a beacon frame, a Centralized Contention (CC) frame, and a management frame.

4. The method according to claim 3, wherein when the HPNA v2-formatted frame is modified to allow a Medium Allocation Element (MAE) in the management frame.

5. The method according to claim 4, wherein the management frame is a Beacon frame.

6. The method according to claim 1, wherein the transmitted message is one of a polling frame, a data frame and a management frame, and includes an encoding indicating a frame type within a body of the transmitted message.

7. The method according to claim 1, wherein the highest physical priority level slot of the first HPNA v2-formatted frame is PRI 7.

8. The method according to claim 1, wherein at least one HPNA v2 STA is associated with the communications medium, the method further comprising steps of:
determining whether the message has collided with a message transmitted from the HPNA v2 STA;
selecting a the Backoff Signal Slot 0 by the MC STA for contending for access to the communications medium when the message is determined to have collided with the message from the HPNA v2 STA, the selected Backoff Signal Slot being associated with a highest access priority to the communications medium; and
retransmitting the collided message when access priority to the communications medium is gained.

9. The method according to claim 8, wherein the step of selecting the Backoff Signal includes a step of repeatedly selecting said highest priority Backoff Signal 0 Slot until the MC STA gains access priority to the communications medium over each HPNA v2 STA.

10. The method according to claim 9, wherein at least one HPNA v2 STA repeatedly selects the Backoff Signal Slot 0 based on a predetermined sequence of Backoff Signal Slot selections.

11. The method according to claim 10, wherein each predetermined sequence of Backoff Signal Slot selections used by the HPNA v2 STA does not include a Backoff Signal Slot selection that is associated with the highest access priority.

12. The method according to claim 9, wherein the step of repeatedly selecting said Backoff Signal Slot 0 for gaining access to the communications medium is based on a predetermined sequence of Backoff Signal Slot selections.

13. The method according to claim 1, further comprising a step of at least one selected non-MC STA receiving the message from the MC STA.

14. The method according to claim 13, further comprising a step of responding at each selected non-MC STA receiving the message with a frame transmitted with the highest physical layer priority level available in the HPNA v2-formatted frame at an appropriate time based on the message from the MC STA.

15. The method according to claim 13, wherein the received message includes a Medium Allocation Packet (MAP) for a plurality of non-MC STAs, the MAP including information relating to one of a specific time period assigned to each of the plurality of non-MC STAs, an order for each of the plurality of non-MC STAs to use the communications medium, an order for transmissions for each of the plurality of non-MC STAs, and a maximum time for each of the plurality of non-MC STAs to occupy the communications medium.

16. The method according to claim 13, further comprising a step of receiving a reply message at the MC STA from at least one selected non-MC STA in response to the transmitted message from the MC STA, the received message starting at a highest physical layer priority level available in a second HPNA v2-formatted frame.

17. The method according to claim 1, wherein at least one HPNA v2 STA is associated with the communications medium, the method further comprising a step of remapping each priority level at a link sublayer for each HPNA v2 STA that is associated with the communications medium prior to the step of transmitting the message from the MC STA so that no data packet from an upper layer in each HPNA v2 STA associated with the communications medium is mapped to a highest physical layer priority level of a MAC sublayer of the HPNA v2 STA.

18. A method for providing access to a communications medium, the communications medium being suitable for allowing use of a plurality of Home Phoneline Network Association (HPNA) v2-formatted frames, each HPNA v2-formatted frame being timed to allow a plurality of physical layer priority level slots, the method comprising steps of:

receiving a message at a non-Media Control Station (non-MC STA) from a Media Control (MC) STA, the non-MC STA and the MC STA each being enhanced STAs that gain access to the communications medium in a centralized manner, the MC STA maintaining a list of sessions in enhanced STAs using the communications medium, the received message starting at a highest physical layer priority level slot available with a first HPNA v2-formatted frame, at least one enhanced STA adapted to always choose a Backoff Signal Slot 0 of an HPNA v2 frame during contention resolution with an HPNA v2 station, the Backoff Signal Slot 0 is one of only three Backoff Signal Slots specified under HPNA v2 for use in contention resolution after a collision; and transmitting a reply message from the non-MC STA in response to the received message to the MC STA, the reply message being transmitted at a highest physical layer priority level available in a second HPNA v2-formatted frame.

19. The method according to claim 18, wherein a frame encoding of at least one HPNA v2-formatted frame is modified to allow a higher encoding rate than permitted by HPNA v2.

20. The method according to claim 18, wherein a frame header encoding of at least the first HPNA v2 formatted frame is modified to allow one of a polling frame, a beacon frame, a Centralized Contention (CC) frame, and a management frame.

21. The method according to claim 20, wherein when the first HPNA v2-formatted frame is modified to allow a Medium Allocation Element (MAE) in the management frame.

22. The method according to claim 21, wherein the management frame is a Beacon frame.

23. The method according to claim 18, wherein the received message is one of a polling frame and a polling frame plus a data frame, and includes an encoding indicating a frame type within a body of the transmitted message.

24. The method according to claim 18, wherein the received message includes a Medium Allocation Packet (MAP) for a plurality of non-MC STAs, the MAP including information relating to one of a specific time period assigned to each of a plurality of non-MC STAs, an order for each of the plurality of non-MC STAs to use the communications medium, an order for transmissions for each of the plurality of non-MC STAs, and a maximum time for each of the plurality of non-MC STAs to occupy the communications medium.

25. The method according to claim 18, wherein the highest physical priority level slot of the first HPNA v2-formatted frame is PRI 7.

26. The method according to claim 18, wherein at least one HPNA v2 STA is associated with the communications medium, the method further comprising steps of:
determining at the non-MC STA whether the reply message has collided with a message transmitted from the HPNA v2 STA;
selecting the Backoff Signal Slot 0 at the non-MC STA for contending for access to the communications medium when the reply message is determined to have collided with the message from the HPNA v2 STA, the selected Backoff Signal Slot being associated with a highest access priority to the communications medium; and
retransmitting the collided reply message to the MC STA when access priority to the communications medium is gained.

27. The method according to claim 26, wherein the step of selecting the Backoff Signal Slot 0 includes a step of repeatedly selecting a Backoff Signal until the non-MC STA gains access priority to the communications medium over each HPNA v2 STA.

28. The method according to claim 27, wherein at least one HPNA v2 STA repeatedly selects the Backoff Signal Slot 0 based on a predetermined sequence of Backoff Signal Slot selections.

29. The method according to claim 27, wherein each predetermined sequence of Backoff Signal Slot selections does not include a Backoff Signal Slot selection that is associated with the highest access priority.

30. The method according to claim 27, wherein the step of selecting a Backoff Signal Slot for gaining access priority to the communications medium is based on a predetermined sequence of Backoff Signal Slot selections.

31. The method according to claim 18, wherein at least one HPNA v2 STA is associated with the communications medium, and
wherein each priority level is remapped at a link sublayer for each HPNA v2 STA that is associated with the communications medium prior to the step of receiving the message from the MC STA so that no data packet from an upper layer in each HPNA v2 STA is mapped to a highest physical layer priority level of a MAC sublayer of each HPNA v2 STA.

32. A communications network, comprising:
a telephone-wire-based communications medium that is suitable for allowing use of a plurality of HPNA v2-formatted frames, each HPNA v2-formatted frame being timed to allow a plurality of physical layer priority level slots; and
a Media Control Station (MC STA) device maintaining a list of sessions in enhanced stations (STAs) using the communications medium, each enhanced STA being one of the MC STA and a non-MC STA, at least one enhanced STA adapted to always choose a Backoff Signal Slot 0 of an HPNA v2 frame during contention resolution with an HPNA v2 station, the Backoff Signal Slot 0 is one of only three Backoff Signal Slots specified under HPNA v2 for use in contention resolution after a collision, and gaining access to the communications medium in a centralized manner, the MC STA transmitting a message to at least one selected non-MC STA using the communications medium, the transmitted message being transmitted with a highest physical layer priority level available in a first HPNA v2-formatted frame.

33. The communications according to claim 32, wherein a frame encoding of at least one HPNA v2-formatted frame is modified to allow a higher encoding rate than permitted by HPNA v2.

34. The communications network according to claim 32, wherein a frame header encoding of at least the first HPNA v2-formatted frame is modified to allow one of a polling frame, a beacon frame, a Centralized Contention (CC) frame, and a management frame.

35. The communications network according to claim 34, wherein when the first HPNA v2-formatted frame is modified to allow a Medium Allocation Element WAE) in the management frame.

36. The communications network according to claim 35, wherein the management frame is the beacon frame.

37. The communications network according to claim 32, wherein the transmitted message is one of a polling frame, a data frame and a management frame, and includes an encoding indicating a frame type within a body of the transmitted message.

38. The communications network according to claim 32, wherein the highest physical priority level slot of the first HPNA v2-formatted frame is PRI 7.

39. The communications network according to claim 32, further comprising at least one HPNA v2 STA that is associated with the communications medium, and
  wherein the MC STA determines whether the message has collided with a message transmitted from the HPNA v2 STA, selects a Backoff Signal Slot for contending for access to the communications medium when the message is determined to have collided with the message from the HPNA v2 STA, the selected Backoff Signal Slot being associated with a highest access priority to the communications medium, and retransmitting the collided message when access priority is to the communications medium is gained.

40. The communications network according to claim 39, wherein the MC STA repeatedly selects a highest priority Backoff Signal Slot until the MC STA gains access priority to the communications medium over each HPNA v2 STA.

41. The communications network according to claim 40, wherein at least one HPNA v2 STA repeatedly selects the Backoff Signal Slot 0 based on a predetermined sequence of Backoff Signal Slot selections.

42. The communications network according to claim 41, wherein each predetermined sequence of Backoff Signal Slot selections does not include a Backoff Signal Slot selection that is associated with a highest access priority.

43. The communications network according to claim 40, wherein the MC STA repeatedly selects the Backoff Signal Slot 0 for gaining access priority to the communications medium based on a predetermined sequence of Backoff Signal Slot selections.

44. The communications network according to claim 41, wherein the message from the MC STA is received at least one selected non-MC STA.

45. The communications network according to claim 44, wherein selected non-MC STA receiving the message responds with a frame transmitted using a highest physical layer priority level available at an appropriate time based on the received message from the MC STA.

46. The communications network according to claim 44, wherein the received message includes a Medium Allocation Packet (MAP) for a plurality of non-MC STAs, the MAP including information relating to one of a specific time period assigned to each of the plurality of non-MC STAs, an order for each of the plurality of non-MC STAs to use the communications medium, an order for transmissions for each of the plurality of non-MC STAs, and a maximum time for each of the plurality of non-MC STAs to occupy the communications medium.

47. The communications network according to claim 44, wherein the MC STA receives a reply message from at least one selected non-MC STA in response to the transmitted message from the MC STA, the received reply message starting at a highest physical layer priority level available in a second HPNA v2-formatted frame.

48. The communications network according to claim 44, further comprising at least one HPNA v2 STA that is associated with the communications medium, and
  wherein the MC STA remaps each priority level at a link sublayer for each HPNA v2 STA that is associated with the communications medium prior to transmitting the message so that no data packet from an upper layer in each HPNA v2 STA associated with the communications medium is mapped to a highest physical layer priority level of a MAC sublayer of the HPNA v2 STA.

49. A communications network, comprising: a telephone-wire-based communications medium that is suitable for allowing use of a plurality of HPNA formatted frames, each HPNA formatted frame being timed to allow a plurality of physical layer priority level slots; and a non-Media Control Station (non-MC STA) device receiving a message from a Media Control (MC) STA, the non-MC STA and the MC STA each being enhanced STAs that gain access to the communications medium in a centralized manner, the MC STA maintaining a list of sessions in enhanced STAs using the communications medium, the received message starting in a highest physical layer priority level available in a first HPNA v2-formatted frame, the non-MC STA transmitting a reply message in response to the received message to the MC STA, the reply message being transmitted using a highest physical layer priority level available with a second HPNA v2-formatted frame, at least one enhanced STA adapted to always choose a Backoff Signal Slot 0 of an HPNA v2 frame during contention resolution with an HPNA v2 station, the Backoff Signal Slot 0 is one of only three Backoff Signal Slots specified under HPNA v2 for use in contention resolution after a collision.

50. The communications network according to claim 49, wherein a frame encoding of at least one HPNA v2-formatted frame is modified to allow a higher encoding rate than permitted by HPNA v2.

51. The communications network according to claim 49, wherein a frame header encoding of at least the first HPNA v2 formatted frame is modified to allow one of a polling frame, a beacon frame, a Centralized Contention (CC) frame, and a management frame.

52. The communications network according to claim 51, wherein when the fItHPNA v2-formatted frame is modified to allow a Medium Allocation Element (MAE) in the management frame.

53. The communications network according to claim 52, wherein the management frame is the beacon frame.

54. The communications network according to claim 49, wherein the received message is one of a polling frame and a polling frame plus a data frame, and includes an encoding indicating a frame type within a body of the transmitted reply message.

55. The communications network according to claim 49, wherein the highest physical priority level slot of the first HPNA v2 formatted frame is PRI 7.

56. The communications network according to claim 55, further comprising at least one HPNA v2 STA that is associated with the communications medium,
  wherein the non-MC STA determines whether the reply message has collided with a message transmitted from the HPNA v2 STA, selects the Backoff Signal Slot 0 for contending for access to the communications medium when the reply message is determined to have collided with the message from the HPNA v2 STA, the selected Backoff Signal Slot being associated with a highest access priority to the communications medium, the non-MC STA retransmitting the reply message when access priority to the communications medium is gained.

57. The communications network according to claim 56, wherein the non-MC STA repeatedly selects the highest access priority Backoff Signal until the non-MC STA gains access priority to the communications medium over each HPNA v2 STA.

58. The communications network according to claim 57, wherein at least one HPNA v2 STA repeatedly selects Backoff Signal Slot 0 based on a predetermined sequence of Backoff Signal Slot selections.

59. The communications network according to claim 58, wherein each predetermined sequence of Backoff Signal Slot selections does not include a Backoff Signal Slot selection that is associated with the highest access priority.

60. The communications network according to claim 56, wherein the non-MC STA repeatedly selects a Backoff Signal Slot for gaining access priority to the communications medium based on a predetermined sequence of Backoff Signal Slot selections.

61. The communications network according to claim 49, further comprising at least one HPNA v2 STA that is associated with the communications network communications medium, and wherein each priority level is remapped at a link sublayer for each HPNA v2 STA that is associated with the communications medium prior to the message being received by the non-MC STA so that no data packet from an upper layer in each HPNA v2 STA is mapped to a highest physical layer priority level of a MAC sublayer of each HPNA v2 STA.

62. A method for providing access to a communications medium, the communications medium being suitable for allowing use of a plurality of Home Phoneline Network Association (HPNA) v2-formatted frames, each HPNA v2-formatted frame being timed to allow a plurality of physical layer priority level slots, the method comprising steps of:

remapping at a link sublayer for each HPNA v2 STA that is associated with the communications medium so that no data packet from an upper layer in each HPNA v2 STA is mapped to a highest physical layer priority level of a MAC sublayer of each HPNA v2 STA;

transmitting a message from a Media Control Station (MC STA) to at least one selected non-Media Control Station (non-MC STA), the transmitted message being transmitted with a highest physical layer priority level available in a first HPNA v2-formatted frame, at least one enhanced STA adapted to always choose a Backoff Signal Slot 0 of an HPNA v2 frame during contention resolution with an HPNA v2 station, Backoff Signal Slot 0 is one of only three Backoff Signal Slots specified under HPNA v2 for use in contention resolution after a collision.

63. The method according to claim 62, further comprising a step of maintaining a list at the MC STA of sessions in enhanced STAs using the communications medium, each enhanced STA being one of the MC STA and a non-MC STA and gaining access to the communications medium in a centralized manner.

64. The method according to claim 62, wherein a frame encoding of at least one HPNA v2-formatted frame is modified to allow a higher encoding rate than permitted by HPNA v2.

65. The method according to claim 62, wherein a frame header encoding of at least the first HPNA v2-formatted frame is modified to allow one of a polling frame, a beacon frame, a Centralized Contention (CC) frame, and a management frame.

66. The method according to claim 65, wherein when the first HPNA v2-formatted frame is modified to allow a Medium Allocation Element (MAE) in the management frame.

67. The method according to claim 66, wherein the management frame is the beacon frame.

68. The method according to claim 62, wherein the transmitted message is one of a polling frame, a data frame and a management frame, and including an encoding indicating a frame type within the transmitted frame.

69. The method according to claim 62, wherein a highest physical priority level slot of the first HPNA v2-formatted frame is PRI 7.

70. The method according to claim 62, further comprising a step of receiving the message at least one selected non-MC STA.

71. The method according to claim 70, further comprising a step of responding at each selected non-MC STA receiving the message starting at a highest physical layer priority level available in an HPNA v2-formatted frame.

72. The method according to claim 71, wherein the received message includes a Medium Allocation Packet (MAP) for a plurality of non-MC STAs, the MAP including information relating to one of a specific time period assigned to each of a plurality of non-MC STAs, an order for each of the plurality of non-MC STAs to use the communications medium, an order for transmissions for each of the plurality of non-MC STAs, and a maximum time for each of the plurality of non-MC STAs to occupy the communications medium.

73. The method according to claim 70, further comprising a step of receiving a reply message at the MC STA from at least one selected non-MC STA in response to the transmitted message from the MC STA, the received reply message starting at a highest physical layer priority level available in a second HPNA v2-formatted frame.

74. The method according to claim 70, wherein the management frame is a Beacon frame.

* * * * *